(12) United States Patent
Maenishi et al.

(10) Patent No.: US 7,603,193 B2
(45) Date of Patent: Oct. 13, 2009

(54) METHOD FOR OPTIMIZATION OF AN ORDER FOR COMPONENT MOUNTING AND APPARATUS FOR OPTIMIZATION OF AN ORDER FOR COMPONENT MOUNTING

(75) Inventors: Yasuhiro Maenishi, Koufu (JP); Takuya Yamazaki, Tosu (JP); Akihito Yamasaki, Kurume (JP); Hiroyoshi Nishida, Minamiarupusu (JP); Ikuo Yoshida, Uji (JP); Chikashi Konishi, Kurume (JP); Masaya Matsumoto, Ogouri (JP)

(73) Assignee: Panasonic Corporation, Osaka (JP)

( * ) Notice: Subject to any disclaimer, the term of this patent is extended or adjusted under 35 U.S.C. 154(b) by 254 days.

(21) Appl. No.: 10/568,965

(22) PCT Filed: Aug. 26, 2004

(86) PCT No.: PCT/JP2004/012672

§ 371 (c)(1),
(2), (4) Date: Feb. 21, 2006

(87) PCT Pub. No.: WO2005/022433

PCT Pub. Date: Mar. 10, 2005

(65) Prior Publication Data

US 2006/0229758 A1    Oct. 12, 2006

(30) Foreign Application Priority Data

Sep. 1, 2003    (JP)    ............................. 2003-308324

(51) Int. Cl.
*G06F 19/00*    (2006.01)

(52) U.S. Cl. ........................................ 700/100; 29/832

(58) Field of Classification Search ................. 700/100, 700/213, 229, 230, 57–60; 414/401, 331.06; 29/832, 740, 741, 759
See application file for complete search history.

(56) References Cited

U.S. PATENT DOCUMENTS 5,410,801 A * 5/1995 Shiloh et al. .................. 29/740

(Continued)

FOREIGN PATENT DOCUMENTS

EP    1 222 711    7/2002

(Continued)

OTHER PUBLICATIONS

Burke et al., New Models and Heuristics for Componet Placement in Printed cricuit Board Assembly, Univ.of Nottingham.*

(Continued)

*Primary Examiner*—Kidest Bahta
(74) *Attorney, Agent, or Firm*—Wenderoth, Lind & Ponack, L.L.P.

(57) ABSTRACT

A method of optimizing an order of component mounting which includes optimizing an order of component mounting for any one pattern among the plurality of patterns, calculating a quotient and a remainder by dividing the total number of the patterns included in the board by the number of mounters, determining the quotient as the number of patterns to be allocated in a case where the remainder is zero. The optimization method also includes determining a number, which is the quotient plus one, as the number of patterns to be allocated to the same number of the mounters as the remainder, starting from the mounter in a process farthest upstream, determining the quotient as the number of patterns to be allocated to the rest of the mounters, in the case where the remainder is one or greater, and allocating the allocated number of patterns, to each of the mounters.

15 Claims, 25 Drawing Sheets

U.S. PATENT DOCUMENTS

| | | | |
|---|---|---|---|
| 5,862,586 A * | 1/1999 | Kimura | 29/832 |
| 6,006,425 A * | 12/1999 | Fukukura et al. | 29/832 |
| 6,298,582 B1 * | 10/2001 | Friton et al. | 36/88 |
| 6,650,953 B2 * | 11/2003 | Schaffer et al. | 700/103 |
| 6,729,018 B1 * | 5/2004 | Takano et al. | 29/743 |
| 6,789,015 B2 * | 9/2004 | Tsuji et al. | 701/301 |
| 7,066,006 B2 * | 6/2006 | Minerath et al. | 73/7 |
| 2002/0138673 A1 * | 9/2002 | Schaffer et al. | 710/28 |
| 2004/0153868 A1 * | 8/2004 | Nonaka et al. | 714/47 |
| 2004/0168310 A1 * | 9/2004 | Takano et al. | 29/832 |

FOREIGN PATENT DOCUMENTS

| | | |
|---|---|---|
| JP | 07-066594 | 3/1995 |
| JP | 9-018199 | 1/1997 |
| JP | 10-209697 | 8/1998 |
| JP | 2000-124676 | 4/2000 |
| JP | 2001-036297 | 2/2001 |
| WO | 02/13590 | 2/2002 |

OTHER PUBLICATIONS

National Semiconductor Corp. , WWW.national.com, Mounting of Surface Mount Components, Aug. 2000, p. 1-10.*

Burke et al., New Models and Heuristics for Componet Placement in Printed cricuit Board Assembly, Univ.of Nottingham, 2000, No page No.*

Wonsik Lee et al., "A Genetic Optimization Approach to Operation of a Multi-head Surface Mounting Machine," IEICE Transactions on Fundamentals of Electronics, Communications and Computer Sciences Inst. Electron. Inf. & Commun., Eng, Japan, vol. E83A, No. 9, Sep. 2000, pp. 1748-1756.

Masri Ayob et al., "Optimisation for Surface Mount Placement Machine," Industrial Technology, 2002., IEEE ICIT '02. 2002 IEEE International Converence on Dec. 11-14, 2002, Piscataway, NJ, USA, vol. 1. Dec. 11, 2002 pp. 498-503.

Patent Abstracts of Japan, vol. 017, No. 449, (M-1465), Aug. 18, 1993, & JP 05-104364 A (Sanyo Electric Co., Ltd.), Apr. 27, 1993, Abstract.

* cited by examiner

FIG. 4B

| Component cassettes | | A Z1–Z48 | | | | B Z49–Z96 | | | | C Z97–Z144 | | | | D Z145–Z192 | | | | |
|---|---|---|---|---|---|---|---|---|---|---|---|---|---|---|---|---|---|---|
| | Tape width | Z1 | Z23 | Z45 | Z47 | No. of tapes | Z49 | Z51 | Z93 | Z95 | No. of tapes | Z97 | Z99 | Z141 | Z143 | No. of tapes | Z145 | Z147 | Z189 | Z191 | No. of tapes | No. of Z positions | Occupied consecutive positions |
| 8(Double) | O | O | O | O | 48 | O | O | O | O | 48 | O | O | O | O | 48 | O | O | O | O | 48 | 192 | 1 |
| 8(Single) | O | O | O | O | 24 | O | O | O | O | 24 | O | O | O | O | 24 | O | O | O | O | 24 | 96 | 1 |
| 12 | O | O | O | O | 24 | O | O | O | O | 24 | O | O | O | O | 24 | O | O | O | O | 24 | 96 | 1 |
| 16 | O | O | O | – | 12 | O | O | O | – | 12 | O | O | O | – | 12 | O | O | O | – | 12 | 48 | 2 |
| 24 | O | O | O | – | 12 | O | O | O | – | 12 | O | O | O | – | 12 | O | O | O | – | 12 | 48 | 2 |
| 32 | O | O | O | – | 12 | O | O | O | – | 12 | O | O | O | – | 12 | O | O | O | – | 12 | 48 | 2 |
| 44 | – | O | O | – | 8 | – | O | O | – | 8 | – | O | O | – | 8 | – | O | O | – | 8 | 32 | 3 |
| 56 | – | O | O | – | 6 | – | O | O | – | 6 | – | O | O | – | 6 | – | O | O | – | 6 | 24 | 4 |
| 72 | – | O | O | – | 6 | – | O | O | – | 6 | – | O | O | – | 6 | – | O | O | – | 6 | 24 | 4 |

| 10 nozzle heads | Inner side | Z1 Z2 | Z3 Z4 | Z5 Z6 | Z7 Z8 | Z9 Z10 | Z11 Z12 | Z13 Z14 | Z15 Z16 | Z17 Z18 | Z19 ~ Z86 | Z87 Z88 | Z89 Z90 | Z91 Z92 | Z93 Z94 | Z95 Z96 |
|---|---|---|---|---|---|---|---|---|---|---|---|---|---|---|---|---|
| | Outer side | Z97 Z98 | Z99 Z100 | Z101 Z102 | Z103 Z104 | Z105 Z106 | Z107 Z108 | Z109 Z110 | Z111 Z112 | Z113 Z114 | Z115 ~ Z182 | Z183 Z184 | Z185 Z186 | Z187 Z188 | Z189 Z190 | Z191 Z192 |
| Heads (Nozzles) | H1 | ○ | ○ | ○ | ○ | ○ | ○ | ○ | ○ | ○ | ○ | — | — | — | — | — |
| | H2 | — | ○ | ○ | ○ | ○ | ○ | ○ | ○ | ○ | ○ | ○ | — | — | — | — |
| | H3 | — | — | ○ | ○ | ○ | ○ | ○ | ○ | ○ | ○ | ○ | ○ | — | — | — |
| | H4 | — | — | — | ○ | ○ | ○ | ○ | ○ | ○ | ○ | ○ | ○ | ○ | — | — |
| | H5 | — | — | — | — | ○ | ○ | ○ | ○ | ○ | ○ | ○ | ○ | ○ | ○ | — |
| | H6 | — | — | — | — | — | ○ | ○ | ○ | ○ | ○ | ○ | ○ | ○ | ○ | ○ |
| | H7 | — | — | — | — | — | — | ○ | ○ | ○ | ○ | ○ | ○ | ○ | ○ | ○ |
| | H8 | — | — | — | — | — | — | — | ○ | ○ | ○ | ○ | ○ | ○ | ○ | ○ |
| | H9 | — | — | — | — | — | — | — | — | ○ | ○ | ○ | ○ | ○ | ○ | ○ |
| | H10 | — | — | — | — | — | — | — | — | — | ○ | ○ | ○ | ○ | ○ | ○ |

○ : Picking up possible
— : Picking up impossible

Mounting points pi=(Component type Ci, X coordinate Xi, Y coordinate Yi, Mounting angle $\theta$i, Control data $\phi$i)

NC data is a list of mounting points pi $$\text{NC data} = \begin{pmatrix} p1 \\ p2 \\ p3 \\ \cdot \\ \cdot \\ \cdot \\ pN \end{pmatrix} = \begin{pmatrix} c1, x1, y1, \theta1, \phi1 \\ c2, x2, y2, \theta2, \phi2 \\ c3, x3, y3, \theta3, \phi3 \\ \cdot \\ \cdot \\ \cdot \\ cN, xN, yN, \theta N, \phi N \end{pmatrix}$$

| Component name | (Appearance) | Component size (mm) | | | 2-D recognition method | Pick-up nozzle | Tact time (sec.) | Speed XY |
|---|---|---|---|---|---|---|---|---|
| | | X | Y | L | | | | |
| 0603CR | | 0.6 | 0.3 | 0.25 | Reflection | SX | 0.086 | 1 |
| 1005CR | | 1.0 | 0.5 | 0.3-0.5 | | SA | | |
| 1608CR | | 1.6 | 0.8 | 0.4-0.8 | | S | 0.094 | |
| 2012CR | | 2.0 | 1.25 | 0.4-0.8 | | | | |
| 3216CR | | 3.2 | 1.6 | 0.4-0.8 | | | | |
| 4TR | | 2.8 | 2.8 | 1.1 | | Cylindrical tip | 0.11 | |
| 6TR | | 4.3 | 4.5 | 1.5 | | | | |
| 1TIP | | 2.0 | φ1.0 | - | | | | |
| 2TIP | | 3.6 | φ1.4 | - | | | | |
| 1CAP | | 3.8 | 1.9 | 1.6 | | S | | |
| 2CAP | | 4.7 | 2.6 | 2.1 | | | | |
| 3CAP | | 6.0 | 3.2 | 2.5 | | M | | |
| 4CAP | | 7.3 | 4.3 | 2.8 | | | | |
| SCAP | | 4.3 | 4.3 | 6.0 | | | | |
| LCAP | | 6.6 | 6.6 | 6.0 | | | | |
| LLCAP | | 10.3 | 10.3 | 10.5 | | ML | | |
| 1VOL | | 4.5 | 3.8 | 1.6-2.4 | | M | 0.13 | 2 |
| 2VOL | | 3.7 | 3.0 | 1.6 | | | | |
| 3VOL | | 4.8 | 4.0 | 3.0 | | | | |

FIG. 15
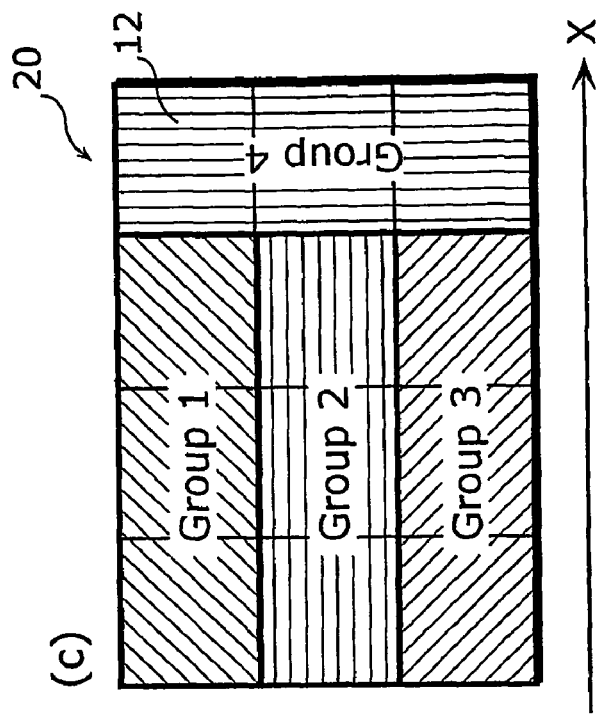
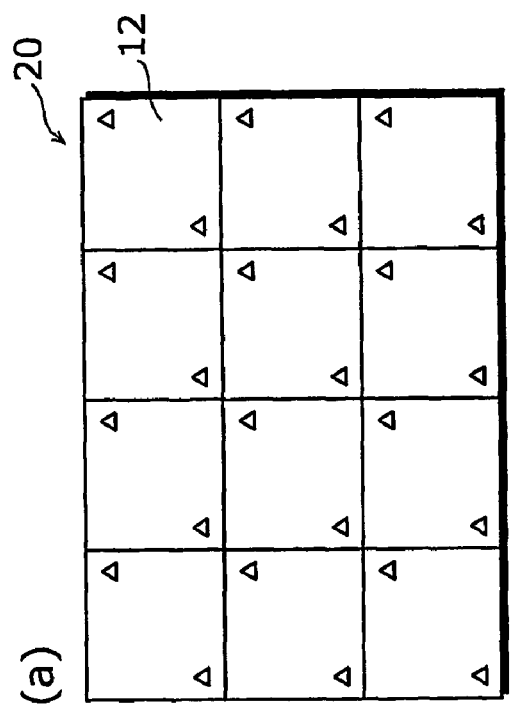
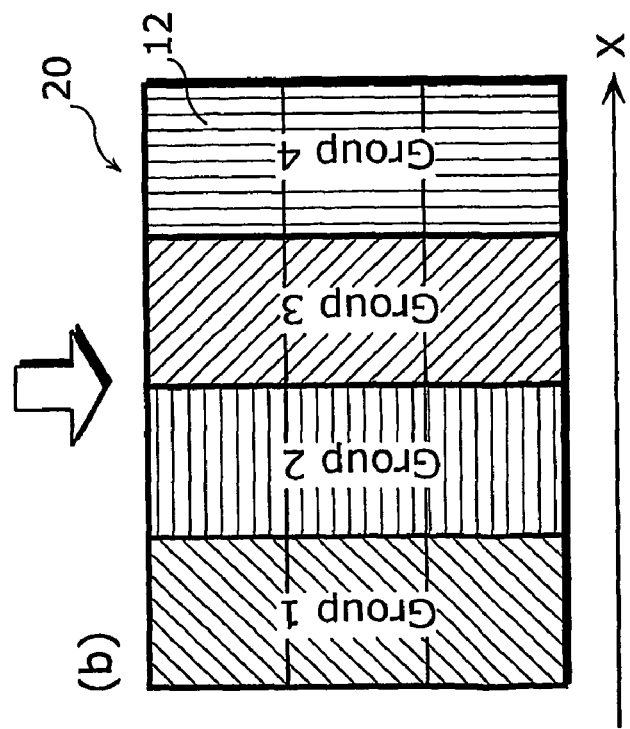

FIG. 16
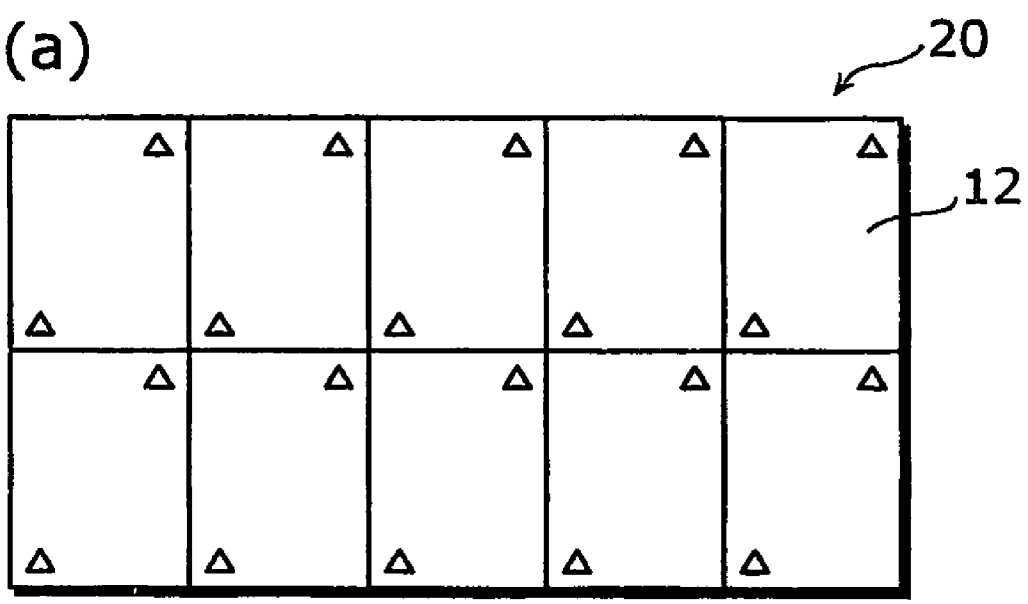
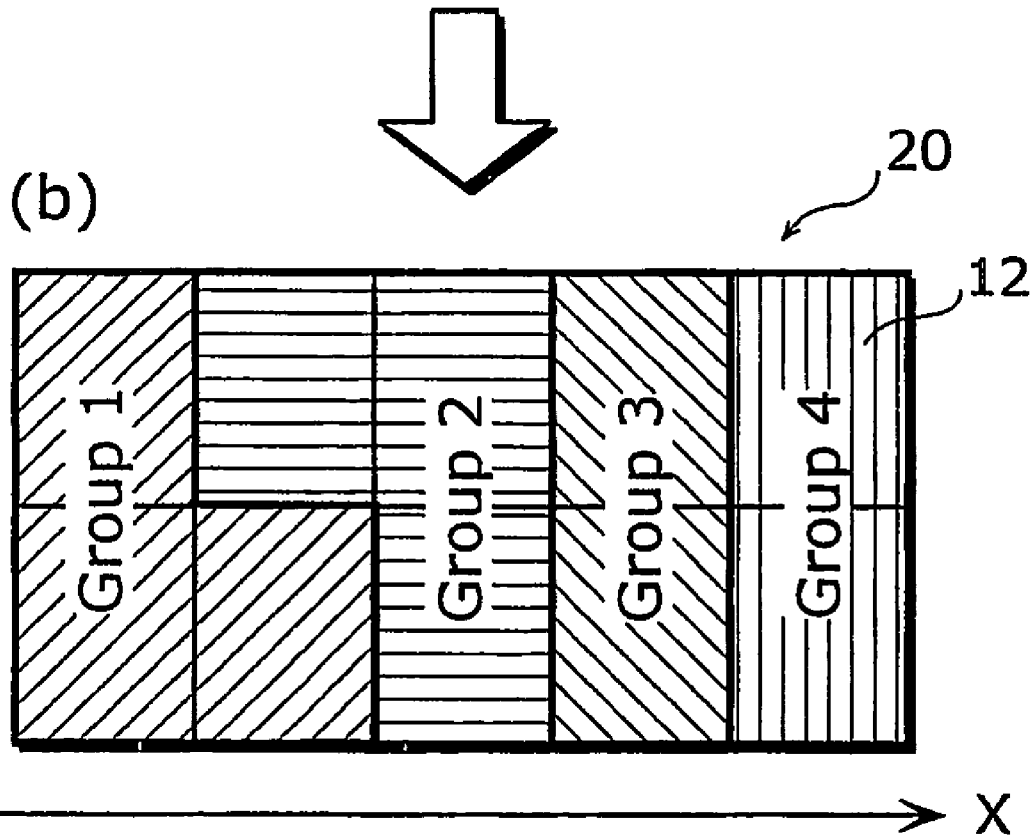

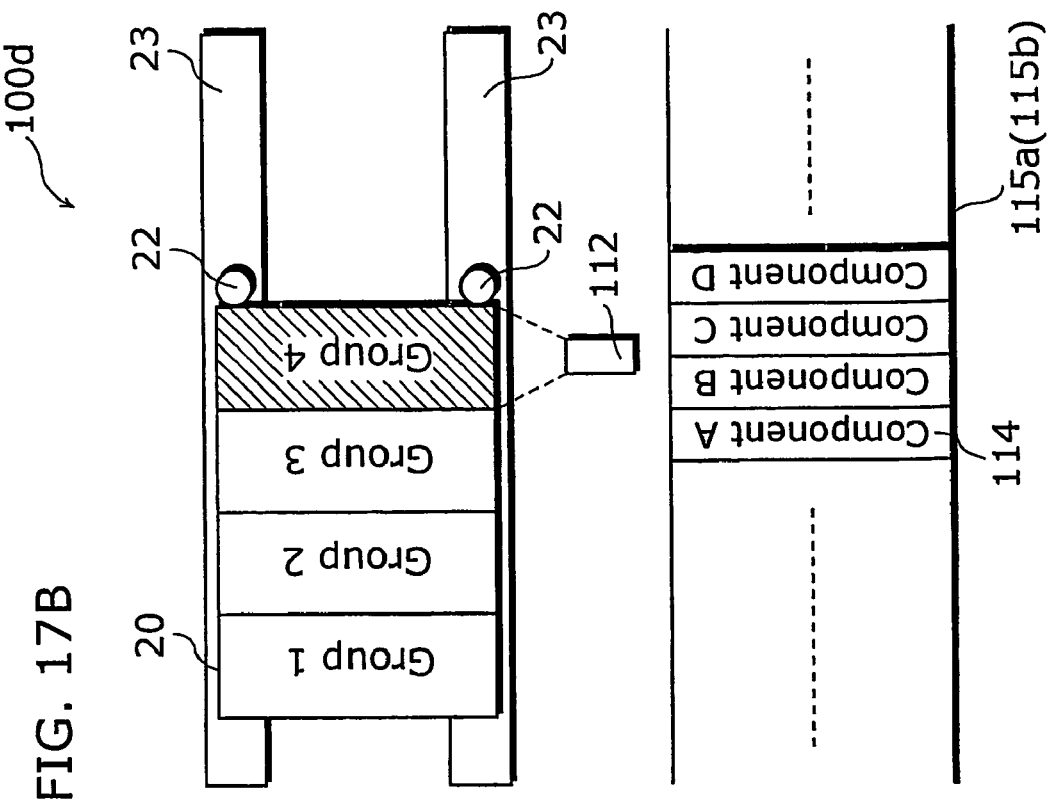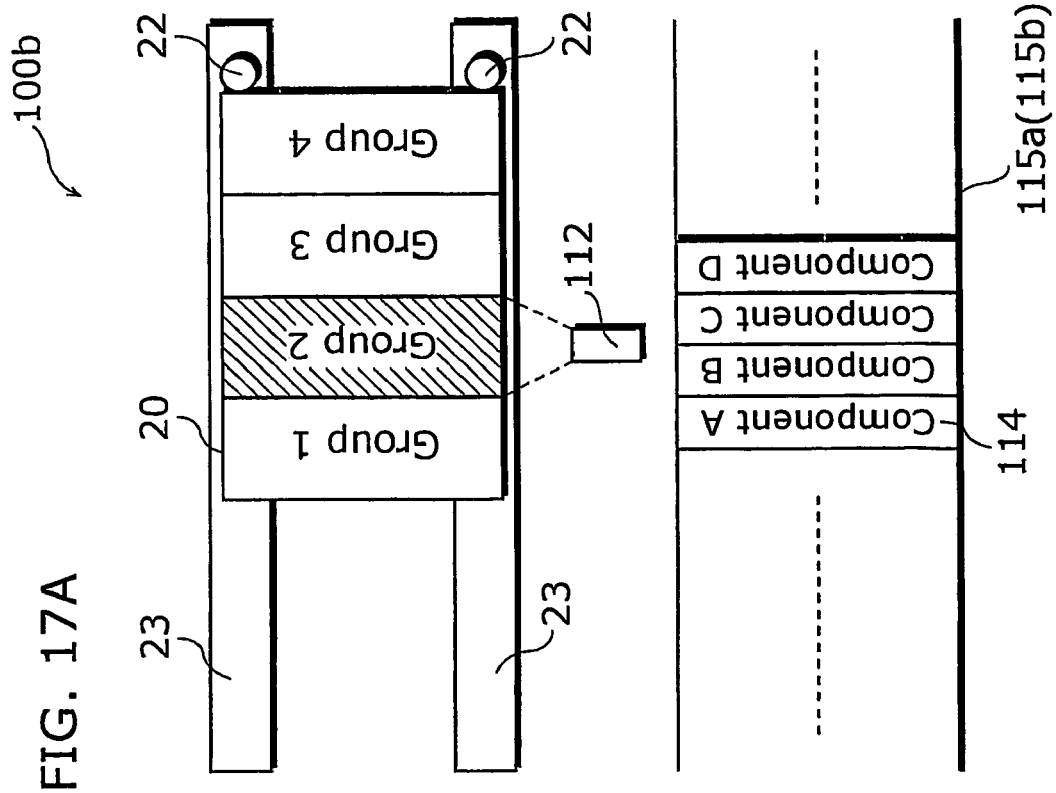

FIG. 25
(a)
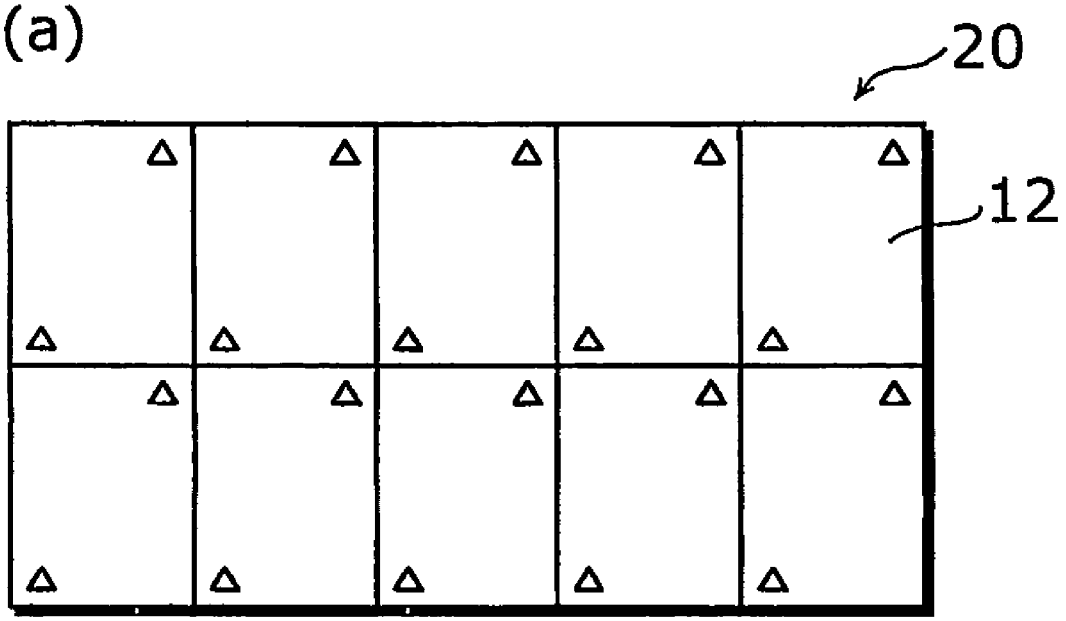
(b)
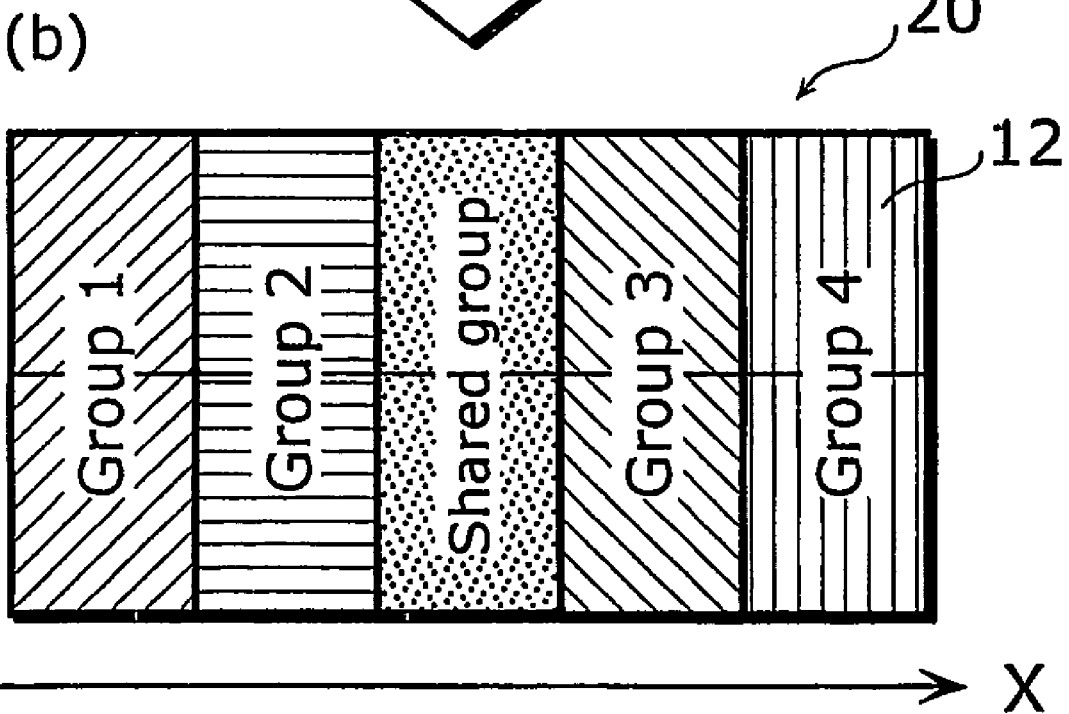

METHOD FOR OPTIMIZATION OF AN ORDER FOR COMPONENT MOUNTING AND APPARATUS FOR OPTIMIZATION OF AN ORDER FOR COMPONENT MOUNTING

BACKGROUND OF THE INVENTION (1) Field of the Invention

The present invention relates to a method for optimization of an order for component mounting by a mounter. In particular, the invention relates to a method for optimization of an order of component mounting on a board that includes a plurality of patterns.

(2) Description of the Related Art

In a component mounting system where a plurality of mounters for mounting electronic components on a board, such as a printed board, are arranged in a mounting line, it is necessary to maintain line balance in such a way that a tact time for each mounter is even. In a component mounting system such as this, optimization of a mounting order is carried out, conventionally, by assigning components to be handled by each mounter based on (i) the tact time and (ii) the number of components for mounting allocated to each component (e.g., the conventional optimization explained in official publication of Japanese Laid-Open Patent Application No. 09-18199 and No. 10-209697).

In other words, as shown in FIG. 20, during the mounting of components onto a board 20, which includes a plurality of patterns 12, optimization of mounting order is carried out by having, among mounters 14a to 14d, a mounter located farther upstream in the process line (e.g., mounter 14a) mounting smaller components and a mounter located farther downstream in the process line (e.g., mounter 14d) mounting larger components.

During component mounting, each of the mounters 14a to 14d perform image recognition of board marks 16 set at corners of the board 20, and corrections are carried out for misalignment in the planar direction, rotational misalignment, expansion and contraction, and so on, of the board 20. Next, image recognition is performed for pattern marks 18 set on each pattern 12, and position determination of the patterns 12 is carried out. Subsequently, component mounting is carried out. In this manner, the performance of high precision position determination becomes possible through image recognition of the pattern marks 18 set on each pattern 12.

However, in the conventional component mounting system, each of the mounters 14a to 14d mounts components on all of the patterns 12 on the board 20. For this reason, each of the mounters is 14a to 14d must perform image recognition of pattern marks of all the patterns 12, requiring the consumption of much time before proceeding with component mounting. As such, there exists the problem of increased tact time for the component mounting system as a whole. For example, in the case where one hundred of the patterns 12 are included in one board 20 and there are two pattern marks 18 on each of the patterns 12, this means that two hundred (=100×2) of the pattern marks 18 are included in a single board 20. Each of the mounters 14a to 14d must perform image recognition of all these two hundred pattern marks 18.

Furthermore, as each of the mounters 14a to 14d carries out component mounting on all the patterns 12, the conventional component mounting system performs optimization so that mounting order is optimal in terms of the board as a whole. For this reason, the problem of taking long calculation times for performing optimization exists as component types and the number of mounting points, which are the subjects for optimization, increase.

In addition, in the case where there is a change in the number of mounters in the mounting line, the problem exists in which changes in line organization cannot be handled flexibly, with optimization having to be performed again from the start.

The present invention is conceived to resolve the issues described above, and has as an objective to provide a component mounting order optimization method for optimizing the order of component mounting so that tact time during component mounting is reduced.

Furthermore, the present invention also has as another objective to provide a component mounting order optimization method in which optimization of mounting order does not consume a lot of time.

In addition, the invention also has, as yet another objective, to provide a component mounting order optimization method that can flexibly respond to line organization modification due to a change in the number of mounters.

BRIEF SUMMARY OF THE INVENTION

In order to achieve the aforementioned objectives, the optimization method of a mounting order of components in the present invention is an optimization method for optimizing an order of component mounting in a component mounting system having a plurality of mounters for mounting components on a board, wherein a plurality of patterns having the same component placement structure is included in the board, said plurality of patterns corresponding respectively to a plurality of sub-boards obtained by partitioning said board, and the optimization method comprises an allocation step of allocating each of the plurality of patterns to any of the plurality of mounters for component mounting.

Each of the plurality of patterns is allotted to any one of the plurality of mounters. Accordingly, during component mounting, each mounter performs image recognition of the pattern marks of only the patterns allotted to it, and component mounting need only be carried out on said patterns. As such, there is no need to perform image recognition of the pattern marks of all the patterns and much time need not be spent prior to component mounting. Consequently, it is possible to reduce the tact time of the component mounting system as a whole.

Furthermore, mounting of the same electronic components is performed by each mounter. As such, even in the case where there are many large-sized components and few small-sized components, for example, the line balance of the component mounting system can be kept uniform.

In addition, even in the case where a change in the number of mounters arises in the component mounting system due to changes in production planning, or the like, optimization is completed by only carrying out changes in the patterns to be allocated to each mounter and changes in the position of the stoppers, without carrying out changes in the optimization of the order of component mounting within the patterns. Consequently, the recommencement of optimization can be done easily and modifications in line organization can be handled flexibly, also in the case where there is a change in the number of mounters.

It is preferable that the aforementioned optimization method of the order of component mounting further comprises a step of optimizing the order of component mounting for any one pattern among the plurality of patterns.

With the inclusion of this step, optimization of the order of component mounting is carried out within one pattern, and the result of the optimization can be used on all the mounters. Consequently, the time required for optimization can be reduced.

In addition, it is preferable that the allocation step includes a pattern number determination step of determining, from a total number of the patterns included in the board and a number of the mounters, a number of patterns to be allocated to each of the mounters so that the number of patterns is approximately even, and includes a pattern allocation step of allocating the determined number of patterns to any of the plurality of mounters for component mounting.

By making the number of patterns to be allocated to each mounter even, line balance can be maintained.

In addition, it is preferable that the pattern number determination step includes a step of calculating a quotient and a remainder by dividing the total number of the patterns included in the board by the number of mounters, a step of determining the quotient as the number of patterns to be allocated, in the case where the remainder is zero, and includes a step of i) determining a number, which is the quotient plus one, as the number of patterns to is be allocated to the same number of mounters as the remainder; starting from the mounter in a process farthest upstream, and ii) determining the quotient as the number of patterns to be allocated to the rest of the mounters, in the case where the remainder is one or greater.

Even in the case where the number of patterns to be allotted to each mounter cannot be made even, stagnation of unprocessed boards at the downstream processes is eliminated by allocating more patterns to the mounters located at the upstream processes.

In addition, it is preferable that the pattern number determination step includes a step of calculating a quotient and a remainder by dividing the total number of the patterns included in the board by the number of mounters, a first allocation sub-step of determining the quotient as the number of patterns to be allocated to each of the mounters, and a second allocation sub-step of determining the remainder as the number of patterns to be commonly allocated to the plurality of mounters. It is preferable that the plurality of mounters is all of the mounters included in the component mounting system.

Even in the case where the aforementioned remainder arises, the remaining patterns are allocated to all the mounters. As such, it is possible to have a uniformed line balance.

In addition, it is preferable that, in the pattern allocation step, the determined number of patterns are allocated to each of the mounters, as the patterns on which components are to be mounted, so that borders between the determined number of patterns allocated to each of the mounters are set orthogonally to a direction in which the board moves. Furthermore, the aforementioned optimization method of the order of component mounting further comprises a step of determining a position of the board during component mounting so that a moving distance, from a default position to the allocated pattern, of a head of each of the mounters is uniform for all of said mounters, the head being used for mounting components on the board.

Through the determination of the setting position of the board by allocating patterns in such a direction, the moving direction from the head to the patterns becomes uniform for each mounter and line balance becomes uniform. Moreover, the aforementioned optimization method of the order of component mounting may further comprise a step of determining placement positions of component cassettes used in component mounting so that a distance from the placement positions of the component cassettes to the allocated pattern, for each of the mounters is uniform for all of said mounters.

Moreover; not only can the present invention be realized as the optimization method of the order of component mounting such as this, the present invention can also be realized as a program causing a computer to execute the characteristic steps of this method, and as a component mounting order optimization apparatus using the characteristic steps of this method as its units. In addition, it goes without saying that it is possible to circulate such a program via a storage medium such as a CD-ROM, and a transmission medium such as the internet.

According to the present invention, the tact time for the component mounting system is reduced.

Furthermore, it is possible to execute the optimization of the order of component mounting in a short period of time.

In addition, it is possible to keep line balance during component mounting.

Furthermore, it is possible to handle changes in the number of mounters flexibly.

FURTHER INFORMATION ABOUT TECHNICAL BACKGROUND TO THIS APPLICATION

The disclosure of Japanese Patent Application No. 2003-308324 filed on Sep. 1, 2003 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the Drawings:

FIG. 4B is a chart indicating the number and positions on the Z-axis of various component cassettes in such construction.

FIG. 10 shows an example of the contents of the mounting point data indicated in FIG. 9.

FIG. 11 shows an example of the contents of the component library indicated in FIG. 9.

FIG. 15 is an exemplary diagram of how patterns are allocated to each mounter.

FIG. 16 is an exemplary diagram of the allocation of patterns in the case where the number of patterns is different among mounters.

FIGS. 17A and 17B are diagrams illustrating the positions of the stopper for each mounter.

FIG. 25 is an exemplary diagram of the shared allocation of a predetermined number of patterns to all of the mounters.

DETAILED DESCRIPTION OF THE INVENTION

First Embodiment

Hereinafter, the component mounting system in the first embodiment of the present invention shall be explained with reference to the diagrams.

(Component Mounting System)

Figure 1:
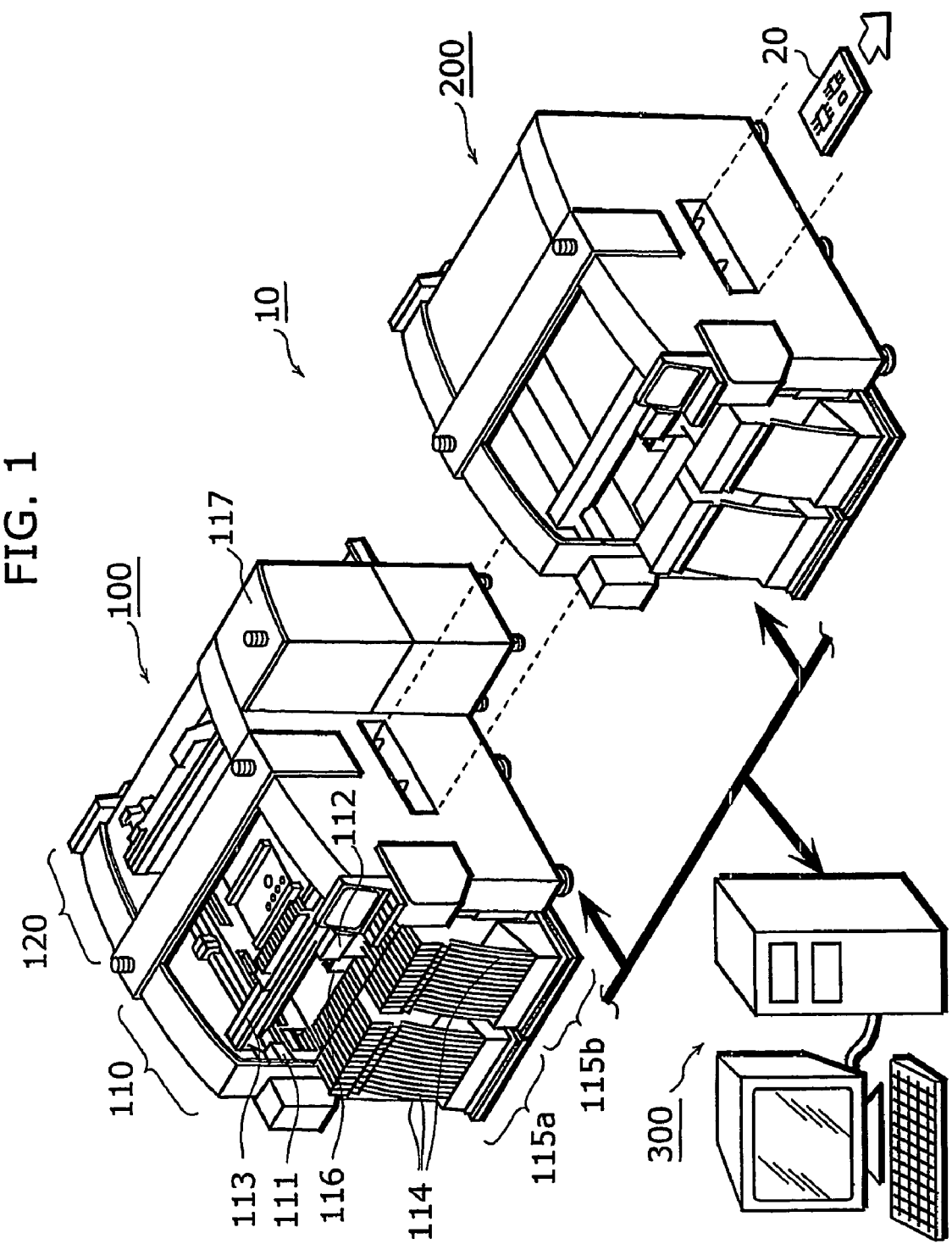
FIG. 1 is an appearance diagram showing the overall construction of a component mounting system in the present invention.

FIG. 1 is an appearance diagram showing the overall construction of a component mounting system 10 in the present invention. The mounting system 10 is composed of a plurality (here, two) of mounters 100 and 200 and an optimization apparatus 300. The mounters 100 and 200 form a production line where electronic components are mounted onto a circuit board 20 that is transported downstream. The optimization apparatus 300 optimizes the mounting order of the required electronic components at the start of production, for example, based on information in a variety of databases, and sets and controls the mounters 100 and 200 having provided them with the NC (Numeric Control) data produced by the optimization.

The mounter 100 is equipped with two sub-units (a front sub-unit 110 and a rear sub-unit 120) that carry out component mounting simultaneously and independently of one another, in concert, or even alternately. Each of these sub-units 110 and 120 is a perpendicular robotic mounting stage and includes two component supplying units 115a and 115b, a multi-placement head 112, an XY robot 113, a component recognizing cameras 116, and a tray supplying unit 117, and so on. The component supplying units 115a and 115b are each made up of an array of up to 48 component cassettes 114 that store component tapes. The multi-placement head 112 (10-nozzle head) has 10 pickup nozzles (hereafter simply "nozzles") that can pick up a maximum of ten components from the component cassettes 114 and mount them onto the circuit board 20. The XY robot 113 moves the multi-placement head 112. The component recognizing camera 116 two-dimensionally and three-dimensionally examines the picked-up state of the components that have been picked up by the multi-placement head 112. The tray supplying unit 117 supplies tray components. Each sub-unit carries out the mounting of components onto a board independently of (in parallel with) the other sub-unit.

Moreover, in practical terms, the expression "component tape" refers to a tape (a carrier tape) in which a number of the same type of components have been arranged, with such tape being supplied from a reel (a supply reel) or the like around which the tape has been wound. Component tapes are mainly used to supply relatively small components called "chip components" to a mounter. However, during the optimization process, a "component tape" refers to data that specifies a group of components belonging to the same component type (that are assumed to have been arranged on a virtual tape). In the process called "component division", there are cases where a group of components belonging to the same component type (that would potentially be arranged on a single component tape) are divided into a plurality of component tapes. Moreover, "component type" indicates the type of electronic components such as a resistor, capacitor, and so on.

Furthermore, it should be noted here that components supplied by a component tape are sometimes called "taped components".

The mounter 100, to be specific, is a mounter with the combined functions of a mounter known as a high-speed mounter and a mounter referred to as a multi-function mounter. The high-speed mounter is a machine characterized by high productivity, mounting mainly electronic components that are 10 mm or less per side, at a speed of 0.1 second per point. The multi-function mounter is a machine for mounting large electronic components that are 10 mm or more per side and irregularly-shaped components such as a switch and a connector, and IC components such as a Quad Flat Package (QFP) and a Ball Grid Array (BGA).

In short, the mounter 100 is designed to be able to mount almost all types of electronic components (mounting components ranging from 0.6 mm×0.3 mm chip resistors to 200 mm connectors), with a production line being formed by arranging the required number of mounters 100 in a line. It should be noted that in the present embodiment, the production line is assumed to be configured by lining up four mounters 100.

(Construction of the Mounter)

Figure 2:
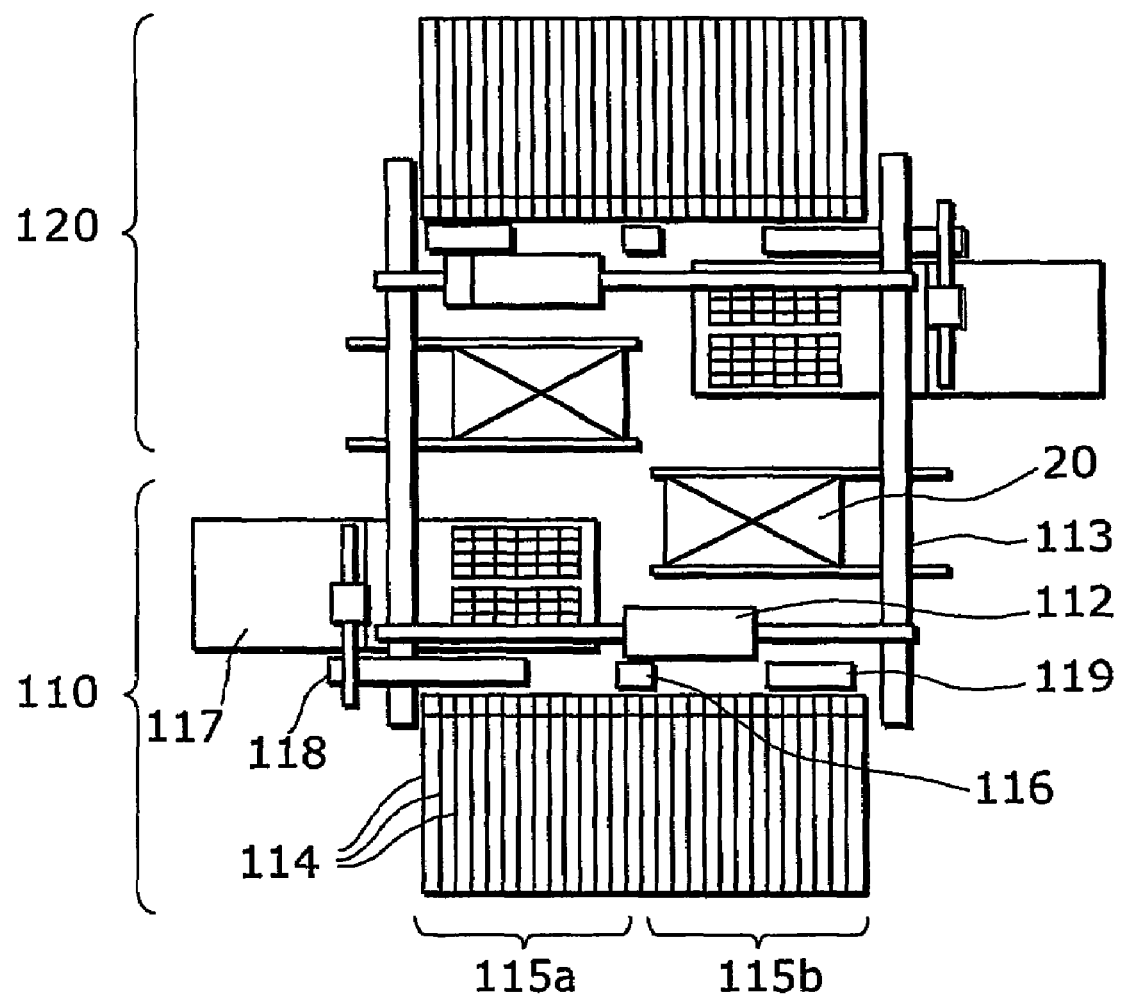
FIG. 2 is an overhead view showing the construction of the mounter in the same component mounting system.

FIG. 2 is an overhead view showing the construction of the mounter 100 which is the subject of the component mounting order optimization in the present invention.

A shuttle conveyor 118 is a moving table on which a component taken from the tray supplying unit 117 is placed and which is moved to a predetermined position where the multi-placement head 112 can pick up components from the shuttle conveyor 118. A nozzle station 119 is a table on which replacement nozzles corresponding to varied forms of component types are positioned.

The component supplying units 115a and 115b included in each sub-unit 110 (and 120) are provided on the left and right sides is of the component recognizing cameras 116. Accordingly, the multi-placement head 112 repeats an operation whereby it picks up components from the component supplying unit 115a or 115b, passes by the component recognizing cameras 116, and then moves to a mounting point on the circuit board 20 and mounts all the picked-up components. Here, "mounting point" refers to the coordinates on the board on which a component is to be mounted. It should be noted that there are also cases where components that are of the same component type are mounted on different mounting points. The total number of the components arranged in component tapes for a single component type (mounting point) matches the number of components (the aggregate number of components to be mounted) for such component type.

Here, a single iteration (pick up, transport, mount) of the repeated series of operations where the multi-placement head 112 picks up, transports, and mounts components, and the group of components mounted in such single iteration, are both referred to as a "task". For example, when the multi-placement head 112 has ten nozzles, the maximum number of components that can be mounted through a single task is ten. It should also be noted that a "pickup operation" refers to all of the operations performed from when the head starts to pick up components to when the multi-placement head 112 transports the components. This includes, for example, not only the case when ten components are picked up by the multi-placement head 112 with a single pickup stroke (a raising and lowering of the multi-placement head 112), but also the case where ten components are picked using several pickup strokes.

Figure 3:
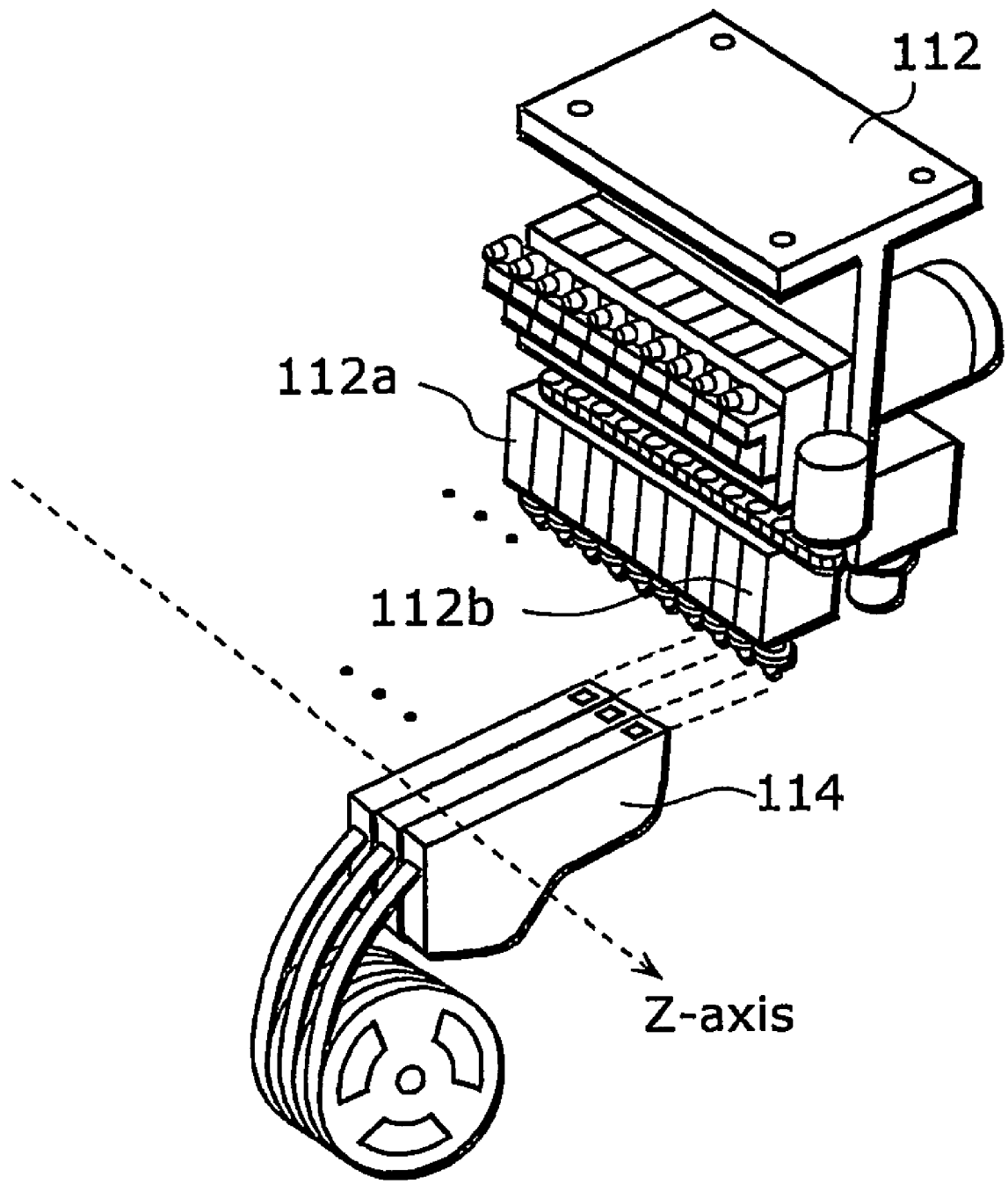
FIG. 3 is a schematic diagram illustrating the physical relationship of the operating head and component cassette of the same mounter.

FIG. 3 is a schematic diagram depicting the positional relationship between the multi-placement head 112 and the component cassettes 114. The multi-placement head 112 is an operating head using the so-called "gang pickup method" and can be equipped with a maximum of ten pickup nozzles 112a to 112b. When thus equipped, one component each from a maximum of ten component cassettes 114 can be simultaneously picked up in a single pickup stroke (one raising and lowering of the multi-placement head 112).

Moreover, it should be noted that only one component tape is loaded into a so-called "single cassette" component cassette 114, while two component tapes are loaded into a so-called "double cassette" component cassette 114. The position of each component cassette 114 (or component tape) in a component supplying unit 115a or 115b is indicated using a "value in the Z-axis" or a "position on the Z-axis", with consecutive values being assigned to the positions beginning with the leftmost position in the component supplying unit 115a as position "1". As such, the determination of the mounting order for taped components amounts to the determination of the sequencing (i.e., positioning on the Z-axis) of component types (or component tapes, or component cassettes 114 in which the component tapes have been stored). Here, the "Z-axis" refers to the coordinate axis (or such coordinate value) identifying the array position of a component cassette installed on each mounter (sub-unit, in the case where a sub-unit is provided).

Figure 4A:
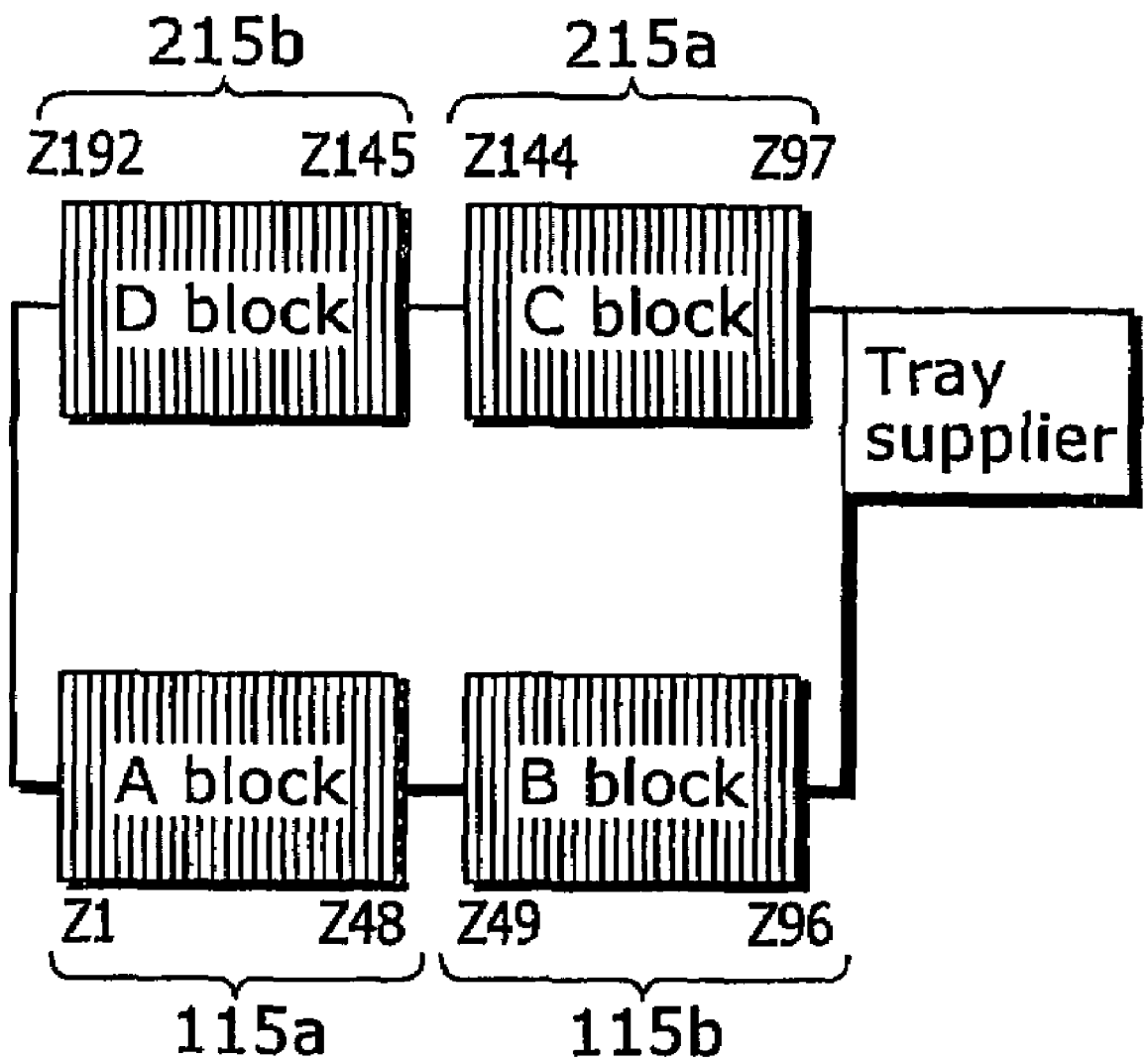
FIG. 4A illustrates an example of the construction of the total of four component supplying units respectively provided in the two mounting units included in the same mounter.

As shown in FIG. 4A, each component supplying unit 115a, 115b, 215a, and 215b can respectively be equipped with a maximum of 48 component tapes (respectively positioned at Z1 to Z48, Z49 to Z96, Z97 to Z114, Z145 to Z192). To be specific, by using a double cassette which stores two component tapes each with an 8 mm tape width, each component supplying unit (A-block to D-block) can be equipped with a maximum of 48 types of components, as shown in FIG. 4B. The number of cassettes that can be provided in a single block is reduced accordingly for components (component cassette) having greater tape widths.

Moreover, the component supplying units 115a and 215a (A-block, C-block), each located on the left side when facing each sub-unit are referred to as the "left-block", and the component supplying units 115b and 215b (B-block, D-block), each located at the right when facing each sub-unit are referred to as the "right-block"

Figures 5A, 5B:
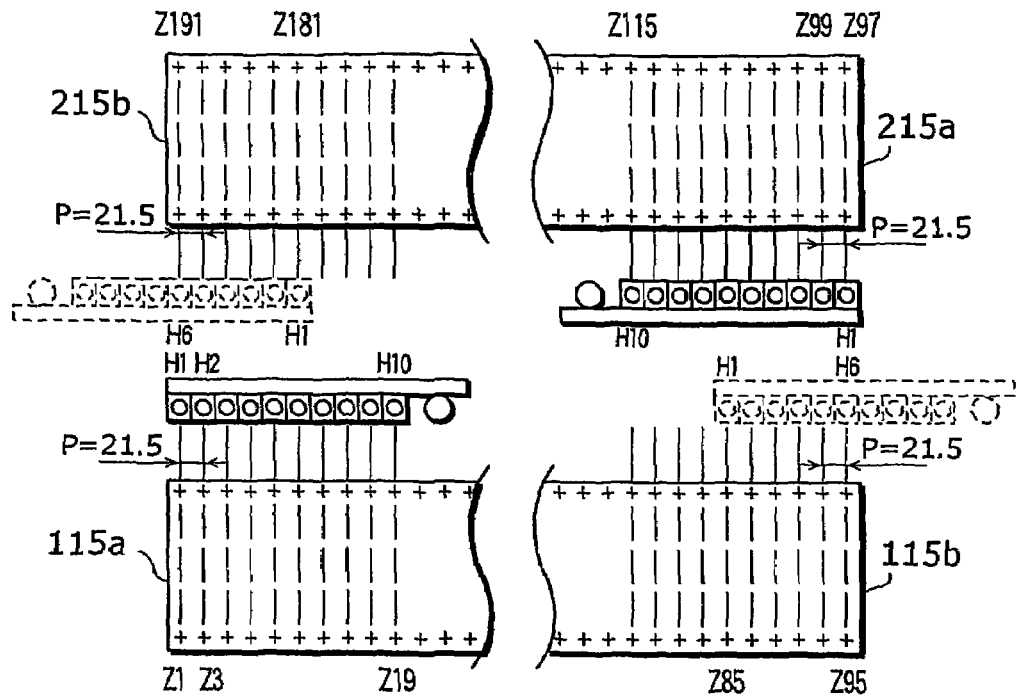
FIGS. 5A and 5B are a diagram and a chart, respectively, showing an example of the positions (on the Z-axis) in the component supplying unit that are accessible for pickup by the 10-nozzle head.
Figure 6A:
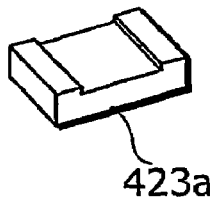
FIGS. 6A to 6D illustrate examples of various chip-shaped electronic components which are the subjects for mounting.
Figure 6B:
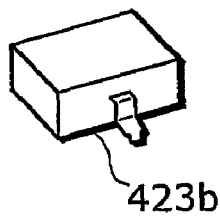
Figure 6C:
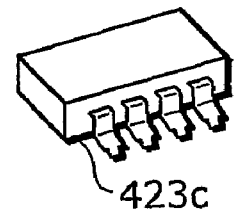
Figure 6D:
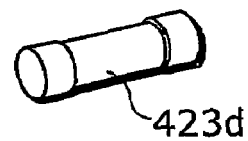

FIGS. 5A and 5B are a diagram and a chart, respectively, showing an example of the positions (on the Z-axis), in a component supplying unit, that are accessible for pickup by the 10-nozzle head. Moreover, H1 to H10 in the diagrams indicate (the positions of) the nozzles provided in the 10-nozzle head.

Here, as the spacing between each nozzle in the 10-nozzle head is equivalent to the width of one double cassette (21.5 mm), the Z numbers of the components that are picked up with one raising and lowering of the 10-nozzle head are at intervals of one (odd numbers only, or even numbers only). Furthermore, as shown in FIG. 5B, due to the movement restrictions of the 10-nozzle head along the Z-axis direction, there are nozzles (marked "-" in the table) that cannot pick up components (Z-axis) forming a part of each component supplying unit.

Figure 7:
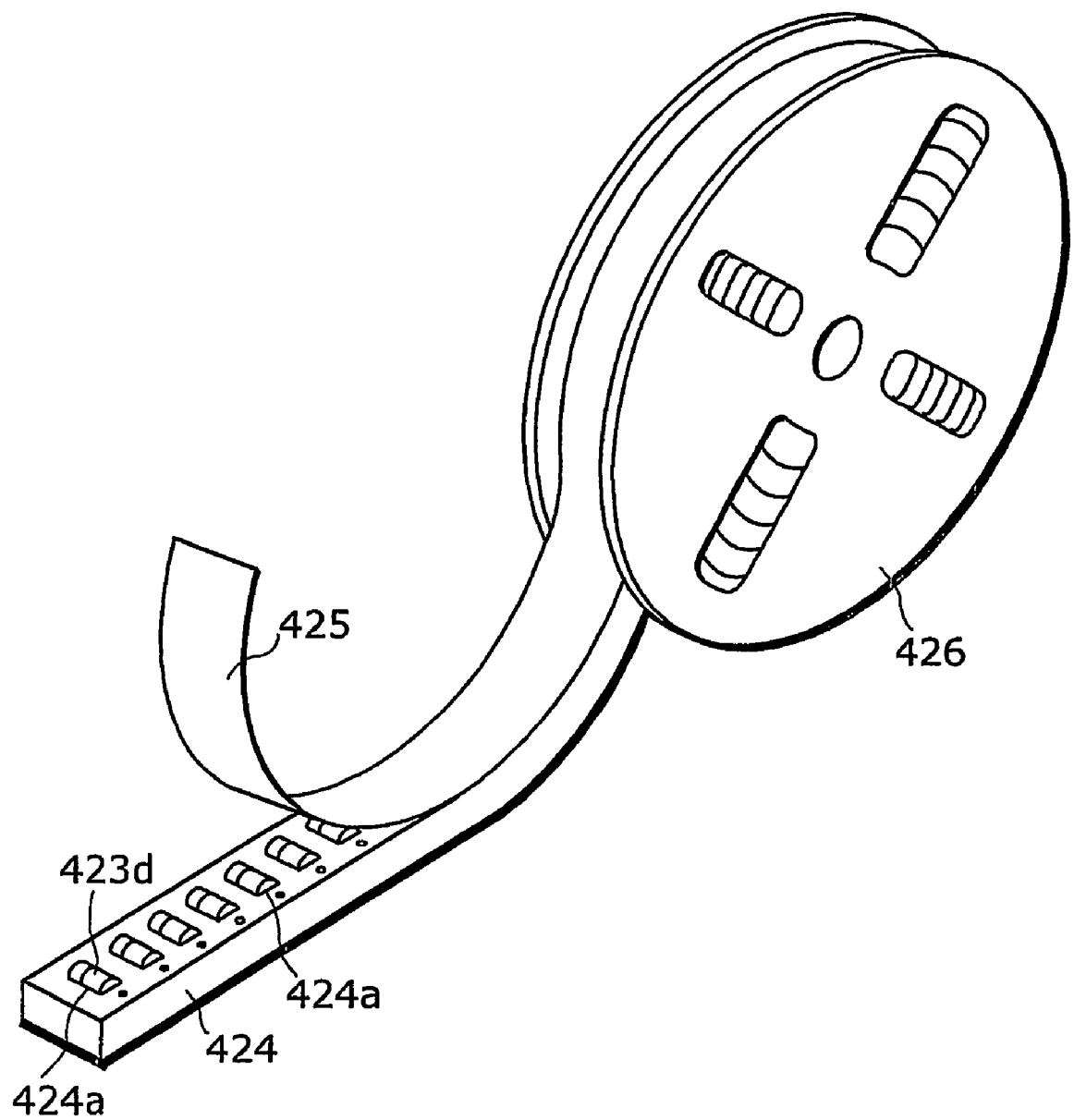
FIG. 7 is a diagram illustrating an example of a carrier tape encasing components and its supply reel.
Figure 8:
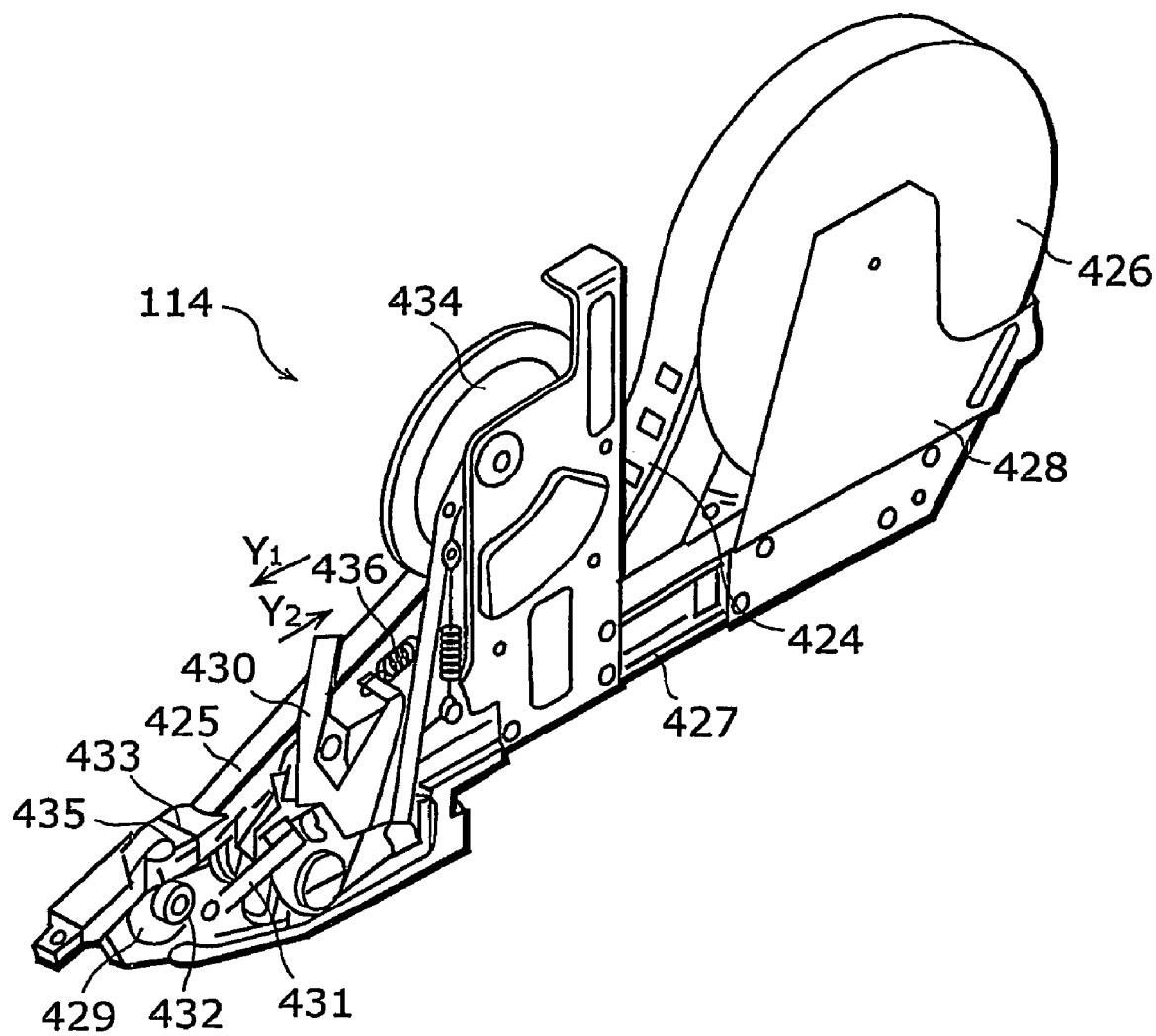
FIG. 8 is a diagram illustrating an example of a component cassette loaded with taped electronic components.

Next, explanation shall be made on the structural details of the component cassette 114, using FIG. 6 to FIG. 8.

FIGS. 6A to 6D respectively show various taped components 423a to 423d. The various chip-shaped electronic components 423a~423d shown in the diagrams are placed into concave storage spaces 424a that are successively formed in fixed intervals in a carrier tape 424 shown in FIG. 7 and are encapsulated by applying a cover tape 425 over the carrier tape 424. A predetermined length of this carrier tape 424 is wound around the supply reel 426 and supplied in tape form (component tape) to users. However, the shape of electronic components, as components to be stored, is not limited to concave shapes. Even if such shape is apart from that in the carrier tape 424 shown in FIG. 7, there are also adhesive tapes for sticking components into place on a tape, paper tapes, and so on.

This taped electronic component 423d is used by being installed in the component cassette 114 shown in FIG. 8, and the supply reel 426 is set on a freely rotating placement on a reel side plate 428 attached to a main body frame 427. The carrier tape 424 pulled out from this supply reel 426 is guided by a feed roller 429. In conjunction with the operation of the automatic electronic mounter (not shown) in which this electronic component supplying device is installed, a feed lever (also not shown) installed in the same mounter moves a feed lever 430 of the electronic component supplying device in the direction of the arrow Y1, and a ratchet 432 is rotated at a fixed angle via a link 431 installed on the feed lever 430. Subsequently, the feed roller 429 is moved only at a fixed pitch (e.g., at a feed pitch of 2 mm or 4 mm), in conjunction with the ratchet 432. It should be noted that there are cases where the carrier tape 424 is discharged by a motor drive or a cylinder drive.

Furthermore, the cover tape 425 is peeled off the carrier tape 424 through the cover tape peeler 433 located before the cassette roller 429 (on the supply reel 426 side), and the peeled off cover tape 425 is wound-up in the cover tape winding reel 434. The carrier tape 424 that has had the cover tape 425 peeled off is conveyed to the electronic component dispensing unit 435. At the same time as the feed roller 429 conveys the carrier tape 424, the chip-shaped electronic component 423d stored in the concave storage unit 424a is drawn out by being picked up by a vacuum pickup head (not shown) from the electronic component dispensing unit 435 which opens in conjunction with the ratchet 432. Subsequently, the aforementioned feed lever relieves the push on the feed lever 430, and under motivation from a pull spring 436, the feed lever 430 moves in the Y2 direction, or in other words, returns to its original position.

The operational characteristics of the mounter 100 are summarized as follows:

(1) Nozzle Replacement

When the nozzle required for the next mounting operation is not found on the multi-placement head 112, the multi-placement head 112 moves to the nozzle station 119 and carries out a nozzle replacement. As an example, S, M, and L-types of nozzles exist, in accordance to the size of the component size that can be picked up.

(2) Component Pickup

The multi-placement head 112 moves to the component supplying units 115a and 115b and picks up electronic components. When ten components cannot be picked up simultaneously in a single iteration, the maximum of ten components can be picked up through several raising and lowering pickup operations while moving the pickup positions.

(3) Recognition Scanning

The multi-placement head 112 moves above the component recognizing cameras 116 at a fixed speed. The images of all the electronic components picked up by the multi-placement head 112 are downloaded and the pickup positions of the components are accurately detected.

(4) Component Mounting

The components are sequentially mounted on the board 20.

Thus by repeating the operations from (1) to (4) mentioned above, all the electronic components are installed on the board 20. The operations from (2) to (4) mentioned above are fundamental operations in the mounting of components by the mounter 100, and are equivalent to a "task". In other words, in one task, a maximum is of ten electronic components can be mounted on a board.

(Mounter Constraints)

The objective for the optimization of the mounting order of components is the maximization of the board production rate per unit of time of the mounter 100. Accordingly, the preferred optimization method (optimization algorithm), as can be determined from the aforementioned functional and operational characteristics possessed by the mounter 100, is an algorithm where ten electronic components that can be efficiently mounted onto a board are (i) selected, (ii) simultaneously picked up from a component supplying unit, and (iii) sequentially mounted through the shortest route. Ideally, a component mounting order determined through such an optimization algorithm can have productivity improved ten-fold, in comparison to the case of component mounting through only a single nozzle.

However, from structural, cost, and operational viewpoints, constraining factors in the determination of the mounting order of components are always present in any mounter. As such, realistically speaking, optimization of the mounting order of components is the maximization of the board production rate per unit of time, as far as possible, under various constraints.

Hereinafter, the main constraints in the mounter 100 shall be enumerated.

(Multi-Placement Head)

The multi-placement head 112 has ten mounting heads arranged in a single line, which perform pickup and mounting operations independently from one another. A maximum of ten pickup nozzles can be attached, and through this series of pickup nozzles, a maximum of ten components can be picked up simultaneously in a single pickup stroke.

Moreover, the individual operating heads (an operating head that picks up a single component) making up the multi-placement head are simply referred to as a "placement head" (or head).

Under a structure where the ten placement heads making up the multi-placement head 112 are arranged in straight-line fashion, there is a constraint with regard to the range of movement of the multi-placement head 112 during component pickup and component mounting. To be specific, when picking up electronic components at both ends (the vicinity of the left end of the left-block 115a and the vicinity of the right end of the right-block 115b) of the component supplying unit, the placement heads that can access such areas are restricted, as shown in FIG. 5B.

Furthermore, the range of movement of the multi-placement head 112 is also subjected to restriction during the mounting of electronic components on the board.

(Component Recognizing Camera)

A 2D camera for taking two-dimensional images and a 3D camera which can detect height information are installed in the mounter 100 as the component recognizing cameras 116. 2D cameras include 2DS cameras and 2DL cameras, depending on the size of the imaging field of view. The 2DS camera has a small field of view but is capable of high-speed imaging and the 2DL camera is characterized by having a large field of view of up to a maximum of 60×220 mm. The 3D camera is used for three-dimensionally examining of whether any of the leads of an IC component are bent out of shape.

The recognition scanning speed during the imaging of electronic components is different depending on the camera. In the case where components using a 2DS camera and components using a 3D camera are present in the same task, recognition scanning must be carried out at each of the respective speeds, or total of two times.

(Component Supplying Unit)

The forms of packaging of the electronic components include the so-called taping format, in which electronic components are stored in tape-form, and include the so-called tray format in which electronic components are stored on a plate with partitions placed in accordance with the size of the components.

The supplying of components by taping is carried out through the component supplying units 115a and 115b, and supplying by tray is performed through the tray supplying unit 117.

Taping for electronic components is standardized, with taping standards with widths from 8 mm to 72 mm existing, in accordance with component sizes. By setting a tape-form component (component tape) in a component cassette (tape feeder unit) complying with a tape width, electronic components can be successively retrieved in a stable manner.

The component supplying unit set with component cassettes is designed so that component tapes of up to 12 mm in width can be installed without gaps at a 21.5 mm pitch. If the tape width is 16 mm or more, the component supplying unit is set by opening the necessary space to accommodate the tape width. In order to simultaneously pick up (in a single raising and lowering stroke) a plurality of electronic components, the respective alignment pitches of the placement heads and component cassettes should match. Ten points can be picked up simultaneously for components with a tape width of up to 12 mm.

Moreover, a maximum of 48 component tapes with widths of up to 12 mm can be installed on each of the two component supplying units (left-block 115a, right-block 115b) making up the component supplying unit.

(Component Cassette)

Component cassettes include single cassettes storing only a single component tape, and double cassettes which are capable of storing a maximum of two component tapes. The two component tapes stored in a double cassette are restricted to component tapes having the same feed pitch (2 mm or 4 mm).

(Other Constraints)

The constraints on the mounter 100 include, not only the constraints arising from the structure of the mounter 100, such as those mentioned above, but also include constraints from the operating aspect such as those listed below, which arise from circumstances in the production site at which the mounter 100 is used.

(1) Fixed Arrangement

For example, there are cases where a particular component tape (or component cassette storing such tape) is given a fixed position (position on the Z-axis) in the component supplying unit in which it is set, in order to reduce the component tape replacement work done manually.

(2) Resource Constraints

There are cases where the number of component tapes, component cassettes storing component tapes, double cassettes, pick-up nozzles (the number for each type), and so on, are restricted to a fixed number.

(Optimization Apparatus)

In the case where the subject for production (boards and components to be mounted thereon) and the equipment for production (mounter provided with limited resources, sub-unit) are provided, the optimization apparatus 300 is an apparatus that determines the component mounting order for manufacturing boards in the shortest time possible (for increasing the number of boards produced per unit of time).

To be specific, it is an apparatus for determining (searching for the optimal solution) on a computer, which position (Z-axis) in which mounter (sub-unit) to place component cassettes set with which sorts component tapes, and the order in which the multi-placement heads of each mounter (sub-unit) can simultaneously pick up the largest possible number of components from the component cassettes, and the order for mounting the plurality of picked-up components onto which positions (mounting points) on the board, in order to minimize the mounting time per board.

During this time, it is necessary to strictly observe the aforementioned constraints possessed by the mounter (sub-unit) being taken into consideration.

(Hardware Construction of the Optimization Apparatus)

The optimization apparatus 300 is realized through the execution of the optimization program according to the present invention, on a general-purpose computer system such as a personal computer. When not connected to an actual mounter 100, the optimization apparatus 300 can also function as a stand-alone simulator (an optimization tool for the order of component mounting).

Figure 9:
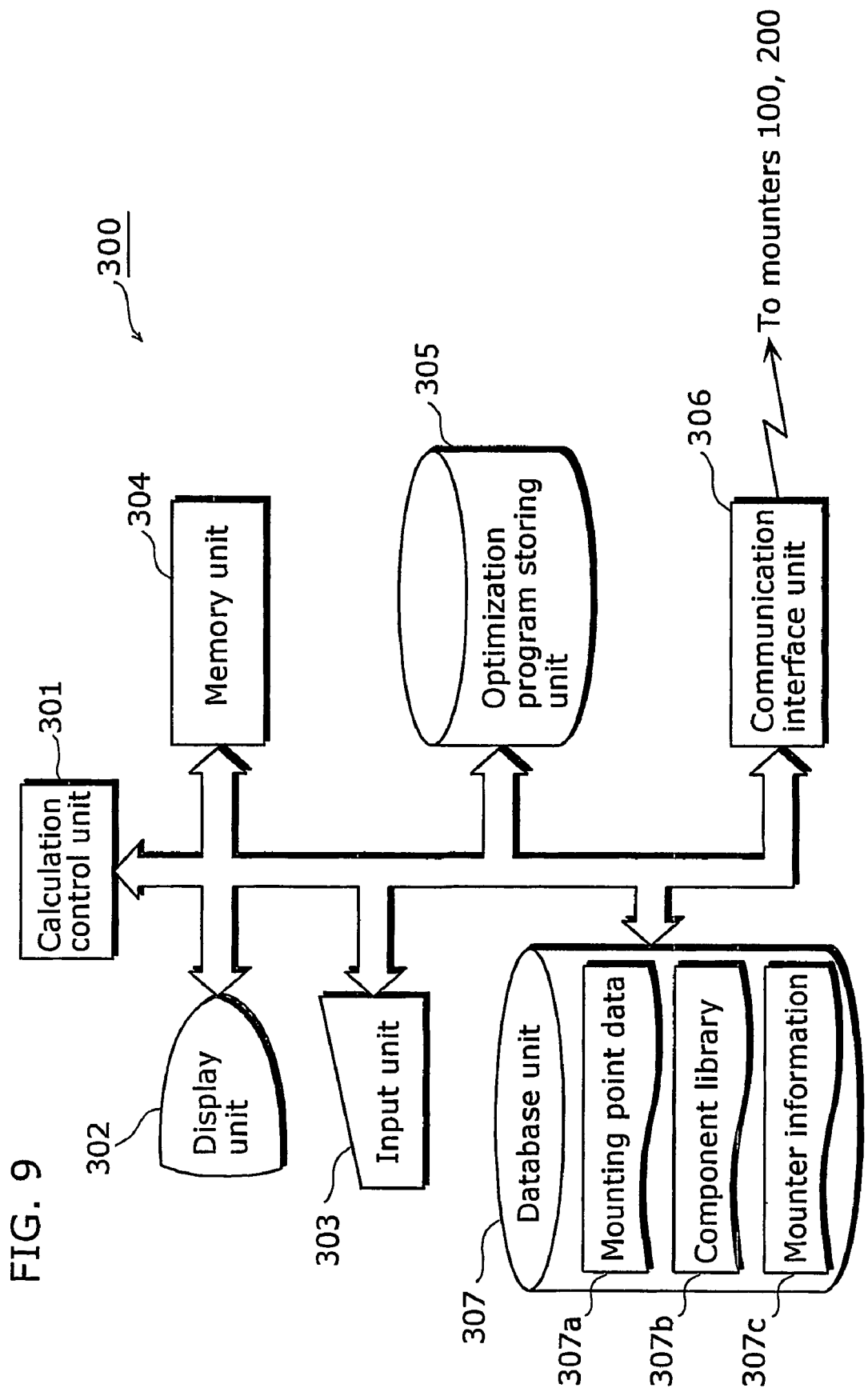
FIG. 9 is a block diagram illustrating the hardware configuration of the optimization apparatus.

FIG. 9 is a block diagram showing the hardware construction of the optimization apparatus 300 shown in FIG. 1. The optimization apparatus 300 is a computer that (i) determines which components should be mounted by each sub-unit and the mounting order of components for each sub-unit, based on information for all of the components that is provided by a CAD (Computer-Aided Design) apparatus for component mounting or the like, and (ii) generates optimal NC data, in order to minimize the line tact time (the highest tact time out of the individual tact times of the sub-units forming the production line) for the mounting of the components on a board given the various constraints based on the specifications, and so on, of the units making up the production line. The optimization apparatus 300 includes a calculation control unit 301, a display unit 302, an input unit 303, a memory unit 304, an optimization program storing unit 305, a communication interface unit 306, and a database unit 307, and so on.

It should be noted that "tact" refers to the total time required to mount components intended to be mounted.

The calculation control unit 301 is a CPU (Central Processing Unit), a numeric processor, or the like. In accordance with instructions from the user, and so on, the calculation control unit 301 loads the required programs from the optimization program storing unit 305 into the memory unit 304 and executes them. The calculation control unit 301 controls the structural components 302 to 307, in accordance with such execution result.

The display unit 302 is a CRT (Cathode Ray Tube), an LCD (Liquid Crystal Display), or the like, while the input unit 303 is an input device such as a keyboard or a mouse. These are controlled by the calculation control unit 301 and are used to allow user interaction with the optimization apparatus 300.

The communication interface unit 306 is a LAN (Local Area Network) adapter or the like, and is used to allow the optimization apparatus 300 to communicate with the mounters 100 and 200.

The memory unit 304 is a RAM (Random Access Memory) or the like that provides a work area for the calculation control unit 301. The optimization program storing unit 305 is a hard disk or the like that stores various optimization programs for implementing the functions of the present optimization apparatus 300.

The database unit 307 is a hard disk drive or the like for storing input data (mounting point data 307a, a component library 307b, and mounter information 307c) that is used in the optimization process performed by the optimization apparatus 300 and mounting point data and other data generated by the optimization process.

Figure 12:
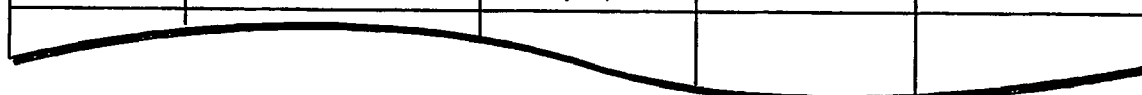
FIG. 12 shows an example of the contents of the mounter information indicated in FIG. 9.

FIGS. 10 to 12 show examples of the mounting point data 307a, the component library 307b, and the mounter information 307c, respectively.

The mounting point data 307a is a collection of information showing the mounting points of all of the components to be mounted. As shown in FIG. 10, one mounting point pi is made up of a component type ci, an X coordinate xi, a Y coordinate yi, a mounting angle $\theta i$ and control data $\emptyset i$. In the present case, the expression "component type" refers to the name of component in the component library 307b shown in FIG. 11, the "X coordinate" and "Y coordinate" are the coordinates of the mounting point (coordinates that indicate a specific position on a board), the "mounting angle $\theta i$" is the rotation angle of the head during component mounting, and "control data" is constraint information (such as the type of pickup nozzle that can be used and the maximum speed at which the multi-placement head 112 should move, and the like) relating to the mounting of the component. It should be noted that the "NC data" to be generated finally is the arrangement of mounting points that results in the shortest line tact time. Moreover, the X-axis direction is the direction in which the board 20 moves and the Y-axis direction is the direction which is orthogonal to the X-axis.

The component library 307b is a library in which specific information for the various component types that can be handled by the mounters 100 and 200 is gathered together. The component library 307b is composed of the component size, tact time (specific tact time for a component type subject to certain conditions), and is other constraint information (such as the type of pickup nozzle that can be used, the recognition method to be used by the component recognizing cameras 116, and the maximum speed at which the multi-placement head 112 should move, and the like), as shown in FIG. 11. It should be noted that in FIG. 11, the external appearance of components of various types have also been shown for reference purposes.

The mounter information 307c is information showing the constructions of each of the sub-units forming the production line and the aforementioned constraints to which these sub-units are subject. As shown in FIG. 12, the mounter information 307c is made up of information such as a unit ID indicating the unit number, head information relating to the type of multi-placement head, nozzle information relating to the types of pickup nozzles that can be attached to the multi-placement head, cassette information relating to the maximum number of component cassettes 114, and tray information relating to the number of levels on which trays are stored in the tray supplying unit 117.

The information described above is referred to as follows. The categories used are equipment option data (for each sub-unit), resource data (the number of cassettes and the number of nozzles that can be used for each unit), nozzle station arrangement data (for each sub-unit equipped with a nozzle station), initial nozzle pattern data (for each sub-unit), and Z-axis arrangement data (for each sub-unit).

(Optimization Process)

Next, an explanation is made regarding the operation of the optimization apparatus 300 in the component mounting system 10 as configured above.

Figure 13:
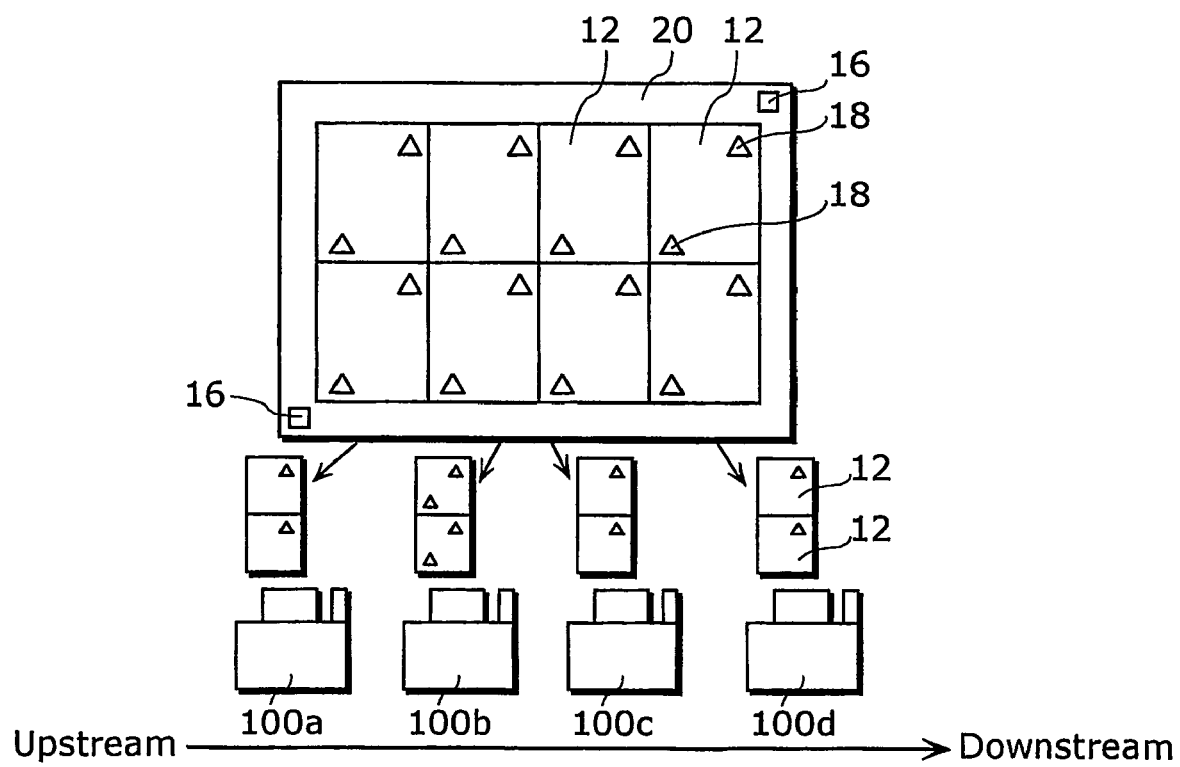
FIG. 13 is an exemplary diagram of how patterns are allocated in the component mounting system according to the present invention.

As described above, the component mounting system 10 is assumed to be made up of four mounters 100. These four mounters 100 are identified, from the upstream process position, as mounters 100a, 100b, 100c, and 100d, as shown in FIG. 13. In the optimization process in the present embodiment, each mounter 100 carries out the mounting of all electronic components within the pattern 12. In other words, components are allocated to each mounter 100 per pattern 12, or per pattern 12 group which is made from a plurality of patterns 12. Moreover, in order to uniform tact time of the mounters, it is preferable that the four mounters 100 are of the same model. It should be noted that within the present specification, a "pattern" is used to indicate a single sub-board in a board composed of multiple sub-boards.

Figure 14:
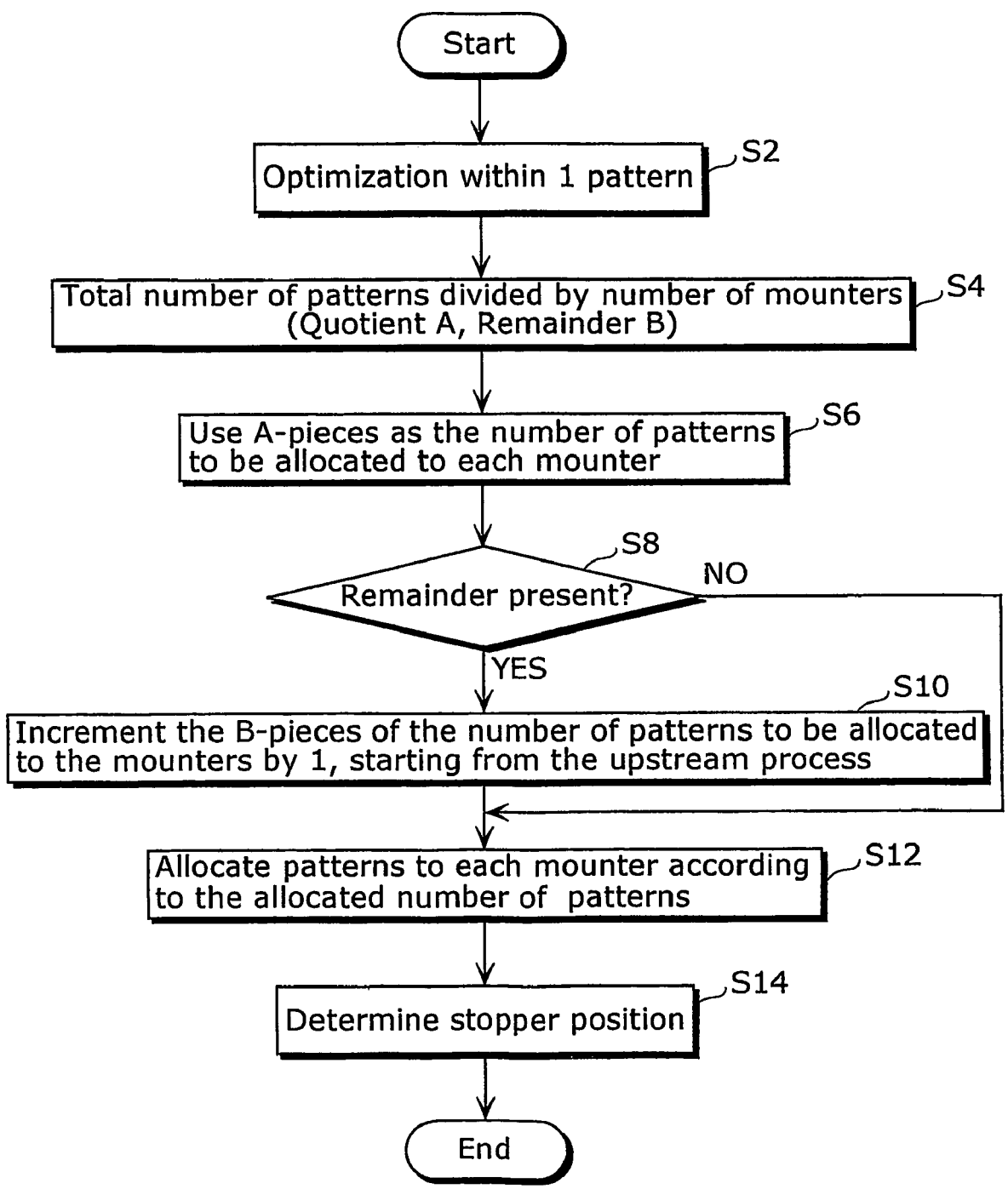
FIG. 14 is a flowchart of the optimization process for the component mounting system, performed by the optimization apparatus.

FIG. 14 is a flowchart of the optimization process for the component mounting system 10, performed by the optimization apparatus 300. The optimization apparatus 300 determines the optimal order of component mounting within a single pattern 12 (S2). The conventional technique can be applied, as is, for this method of determining component mounting order. As such, without repeating detailed explanations, it should be noted, for example, that mounting is carried out sequentially starting from components with the smallest component size, and that mounting order within a gathering of components having approximately the same size, is determined in such a way that the moving distance of the multi-placement head 112 is minimized.

After the mounting order of electronic components within a single pattern 12 is determined, the optimization unit 300 divides the total number of patterns 12 included in a single board 20 by the number of mounters 100 and obtains a quotient A and a remainder B (S4). Next, the allocated number of patterns for each mounter 100 is determined as A-pieces each (S6). Here, in the case where the remainder B is not 0 (YES in S8), one each of the B-pieces of the patterns 12 are allocated, starting from the mounter 100 located in is the process farthest upstream (S10). By allocating in this manner, the load on the mounters 100 located in processes downstream is lightened, and stagnation of unprocessed boards 20 at the downstream processes is eliminated.

Next, the optimization apparatus 300 determines which pattern 12. on the board 20 shall actually be performed of component mounting by each mounter 100, according to the allocated number of patterns for each mounter 100 (S12). The allocation of patterns 12 is carried out in such a way that, as much as possible, the X coordinates of patterns 12 allocated to one mounter 100 are the same. By carrying out the allocation of patterns 12 in this manner, the moving distance, from the component pickup position on the component supplying unit to the patterns 12, of a multi-placement head 112 of a mounter 100 is uniform for every mounter 100 and line balance becomes uniform. A concrete example for this shall be discussed later.

During component mounting, the board 20 is transported on a rail and stopped at a particular position by an attachment referred to as a stopper. The position of the stopper is determined based on the position of the allocated pattern (S14). A concrete example of this process shall also be discussed later.

Next, the optimization process described earlier shall be explained in detail, with specific example being provided. As shown in FIG. 15(a), in the case of a board 20 that includes twelve patterns 12, the quotient A is 3 and the remainder B is 0 when the number of patterns 12 is divided by 4 which is the number of the mounters 100a to 100d (S4 in FIG. 14). As such, the allocated number of patterns for each of the mounters 100a to 100d is 3 (S6). Next, patterns are allocated to each of the mounters 100a to 100d. As mentioned previously, allocation is carried out in such a way that, as much as possible, X coordinates are the same (S12). Consequently, as shown in FIG. 15(b), groups 1 to 4 having three patterns 12 each are respectively allocated to the mounters 100a to 100d. By carrying out the allocation in this manner, the X coordinates of the patterns 12 within each group are the same. Accordingly, carrying out an allocation which disregards the X coordinates, despite the possibility of being able to collate the X coordinates of the patterns 12 by placement within the same group, as shown in FIG. 15(c) is not recommended. Moreover, although allocation of the pattern 12 is carried out in such a way that the X coordinate is smaller for a mounter 100 located in a process position farther upstream in FIG. 15(a), this rule does not necessarily have to be followed.

Next, in the case of a board 20 that includes ten patterns 12, as shown in FIG. 16(a), the quotient A is 2 and the remainder B is 2, when the number of patterns which is 10 is divided by 4 which is the number of units of the mounters 100a to 100d (S4 in FIG. 14). As such, first the allocated number of patterns for each of the mounters 100a to 100d is determined to be 2 (S6). Next, as the remainder B is not 0 (YES in S8), one of each of the number of patterns is respectively allocated to the mounters 100a and 100b located in the processes farthest upstream (S10). Accordingly, the allocated number of patterns for the two mounters 100a and 100b located upstream is 3, and the allocated number of patterns for the mounters 100c and 100d located in subsequent processes downstream is 2.

Next, patterns 12 are allocated to each of the mounters 100a to 100d. As mentioned previously, allocation is carried out in such a way that, as much as possible, the X coordinates of the patterns are the same (S12) for each mounter. Consequently, allocation of patterns 12 is carried out in such a way that X coordinates become smaller as a mounter 100 is located in a processing position farther upstream, as shown in FIG. 16(b).

After the allotment of the patterns 12 to each of the mounters is 100a to 100d is carried out, the position of the stopper is determined (S14). FIG. 17A illustrates the position of the stopper of the mounter 100b and FIG. 17B shows the position of the stopper of the mounter 100d.

As shown respectively in FIG. 17A and FIG. 17B, component mounting is carried out after the board 20 being transported on a rail 23 is stopped at the position of a stopper 22. This position of the stopper 22 is established in such a way that the distance from the component pickup position of the multi-placement head 112 to the positions of the patterns 12 allocated to each of the mounters 100a to 100d, is approximately the same for each of the mounters 100a to 100d.

Thus, optimization of the mounting order of components is carried out in the manner stated above.

After optimization of the mounting order of components is performed by the optimization apparatus 300, component mounting is carried out by each of the mounters 100a to 100d in accordance with such mounting order. The pattern 12 to be handled by each of the mounters 100a to 100d is prescribed. As such, during component mounting, image recognition of the board marks 16 set at corners of the board 20 is performed, and corrections for positional misalignment carried out. Subsequently, image recognition of the pattern mark 18 of the patterns 12 to be handled by each of the mounters 100a to 100d is performed and component mounting carried out, as shown in FIG. 13.

Figure 18:
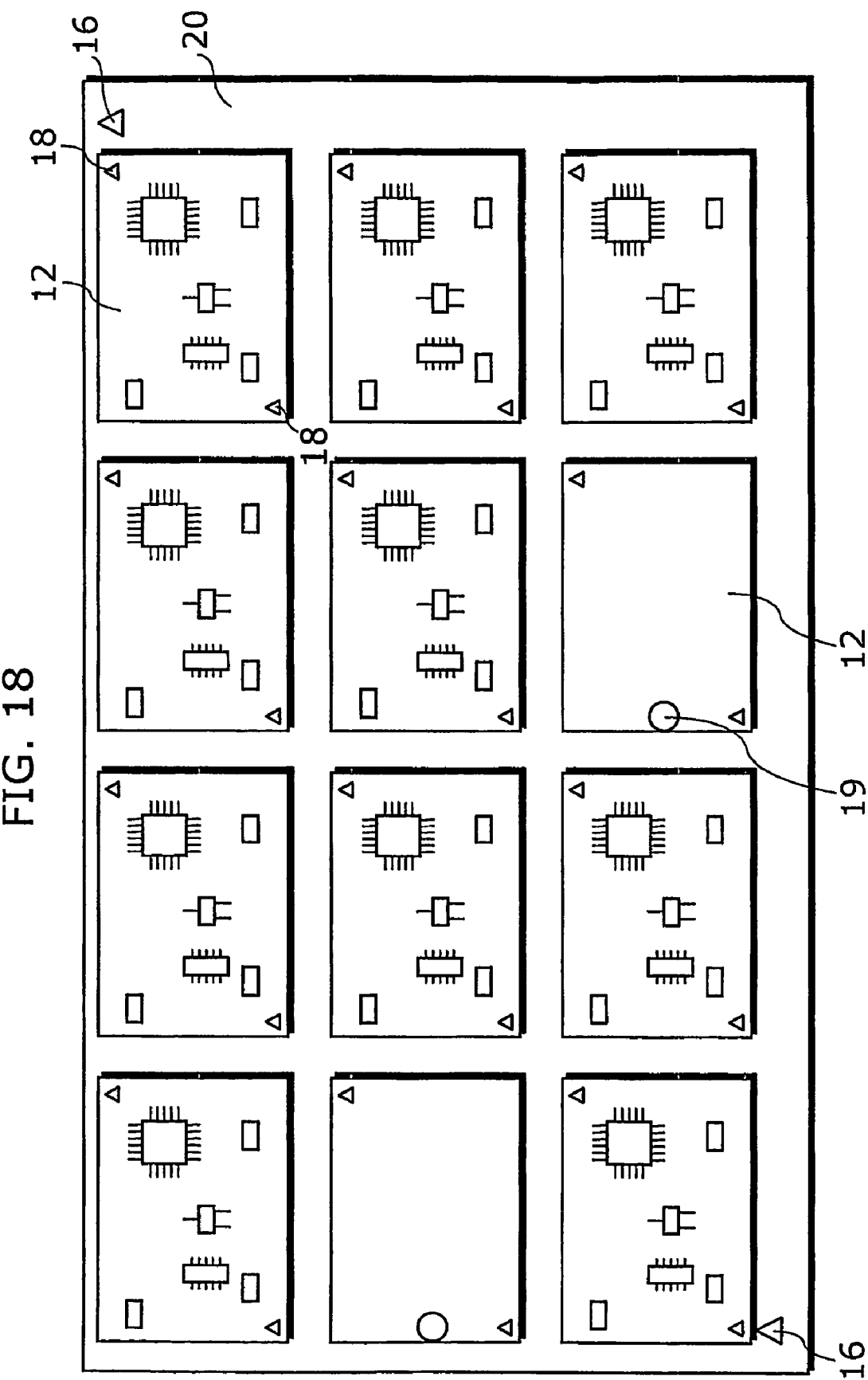
FIG. 18 is an exemplary diagram of the marks placed on the board.

Moreover, as shown in FIG. 18, a mark known as a bad mark 19 is placed on some of the patterns 12 within the board 20. The patterns 12 bearing the bad mark 19 are considered as having had a defect occur at an earlier process. Consequently, the mounters 100a to 100b do not carry out component mounting on the patterns 12 that have been image-recognized as having the bad mark 19.

EFFECT OF THE EMBODIMENT

As explained above, according to the present embodiment, a single mounter carries out component mounting on previously allocated patterns only, and not on all patterns on a board. As such, each mounter does not need to perform the image recognition of the pattern marks of all the patterns. Thus, tact time for the component mounting system, as a whole, can be minimized as much time is not spent during the period leading to component mounting.

For example, in the case where 200 pattern marks are included in a single board and 4 mounters are assumed to be present, each mounter is required to recognize the pattern marks of 200 spots in the conventional component mounting system. However, in the component mounting system according to the present embodiment, it is sufficient for each mounter to recognize the pattern marks of only 50 (=200/4) spots.

Furthermore, according to the present embodiment, optimization of the component mounting order is carried out within a single pattern, which is then used for all the mounters. As such, the time required for optimization can be reduced.

In addition, mounting of the same electronic component is carried out by each mounter. For this reason, even in the case where there are many large-sized components and a few small-sized components, for example, the line balance of the component mounting system can be kept uniform.

Further still, even in the case where a change in the number of mounters in the component mounting system arises as a result of changes in production planning, and so on, optimization can be completed by merely performing changes in the patterns to be allocated to each mounter and changes in the position of the stoppers, without performing changes on the optimization of the component mounting order within the pattern. As such, even in the case where there is a change in the number of mounters, optimization can be redone with ease, and changes in line organization can be handled flexibly.

Furthermore, the position of the stopper is determined in such a way that the distance from the component pickup position of the multi-placement head to the patterns to be mounted on is uniform among the mounters. As such, moving distance of the multi-placement head and mounting time is almost uniform for every mounter, and line balance becomes uniform.

Furthermore, pattern allocation is carried out in such a way that, as much as possible, every mounter is allocated with patterns having the same X coordinate. As such, the moving distances of the multi-placement head of a mounter, from the component pick up position of the component supplying unit to the patterns, is uniform for every mounter and line balance becomes uniform.

Second Embodiment

Next, the component mounting system according to the second embodiment of the present invention shall be explained.

Figure 21:
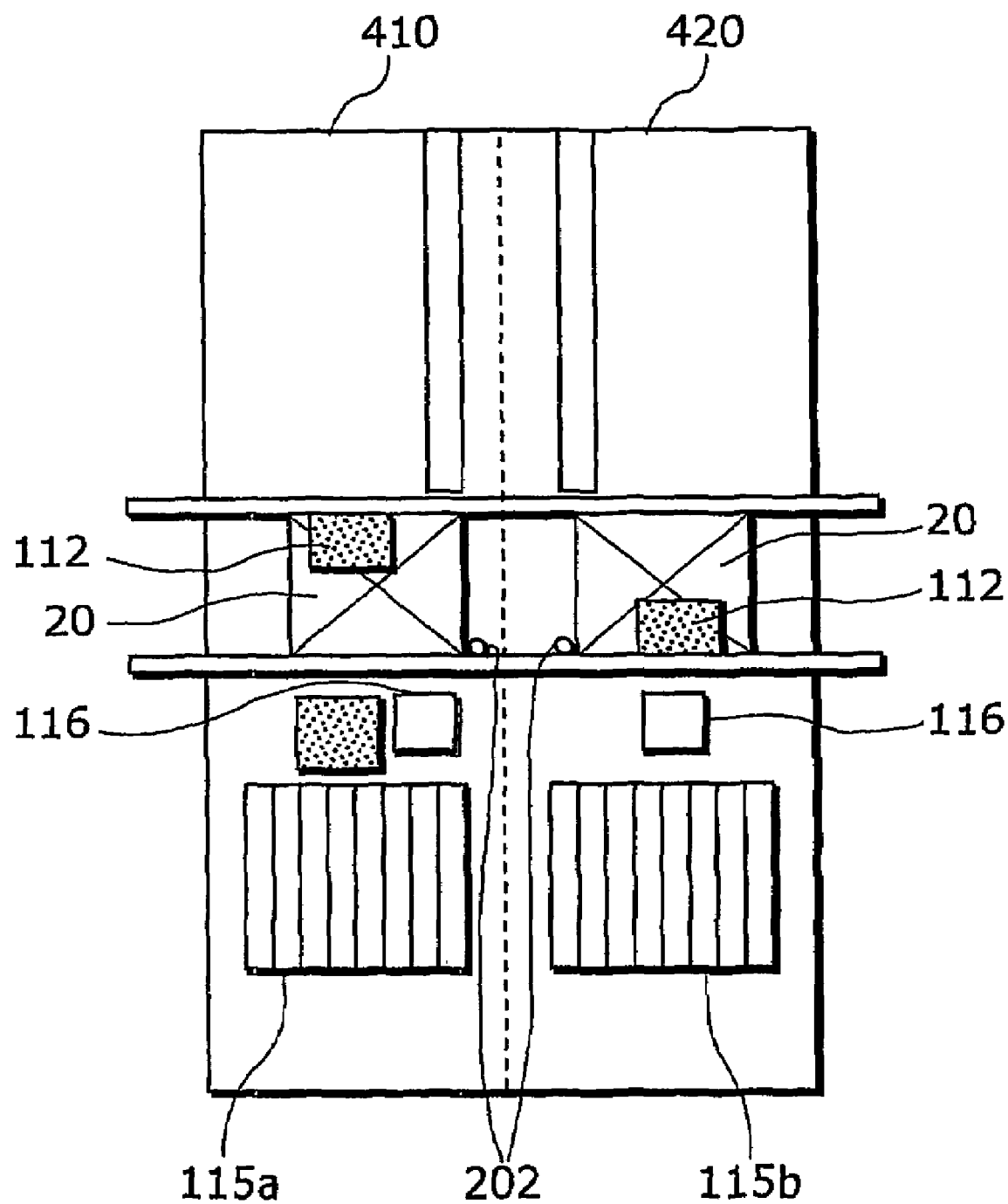
FIG. 21 is an overhead view showing the fundamental construction of the mounter in the component mounting system.

The component mounting system according to the second embodiment possesses the same hardware configuration as the component mounting system in to the first embodiment. However, the mounter 100 in the present embodiment is different from the mounter 100 shown in FIG. 2 in that it does not include the sub-unit 110 and sub-unit 120 and instead, includes a left sub-unit 410 and a right sub-unit 420, as shown in FIG. 21. In order to reduce the width of the space needed for component mounting, a reference pin 202 which determines the position of the board is set at the central part of the mounter shown in FIG. 21. A board 20 enters from the right side in the diagram and components are mounted through the right sub-unit 420. Subsequently, the board 20 is transported to the left sub-unit 410, and components are mounted through the left sub-unit 410.

Figure 22:
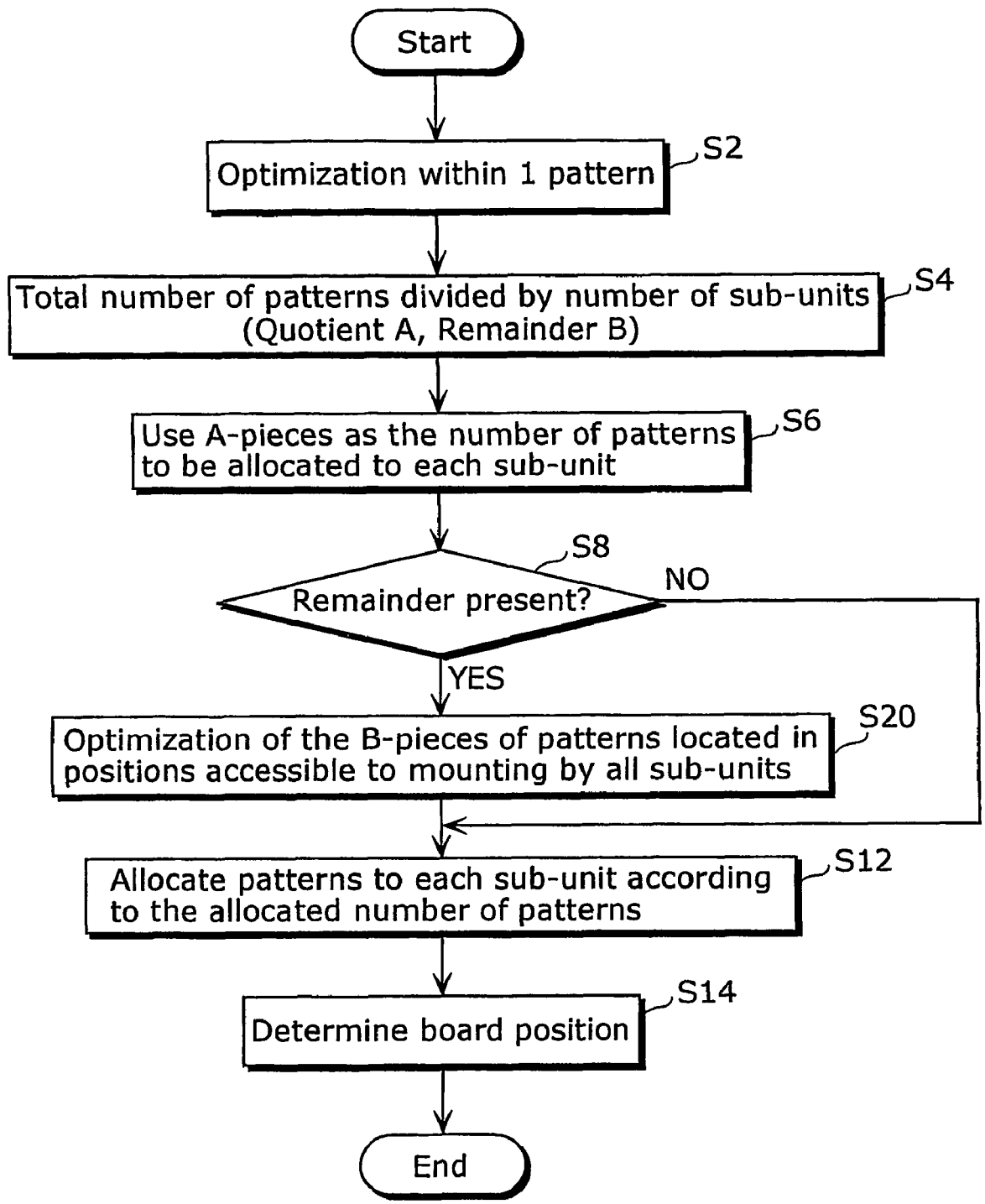
FIG. 22 is a flowchart of the optimization process for the component mounting system, performed by the optimization apparatus.

FIG. 22 is a flowchart of the optimization process for the component mounting system 10, performed by the optimization apparatus 300. In the optimization process in the first embodiment shown in FIG. 14, when the total number of the patterns 12 included in a single board 20 is divided by the number of mounters 100, one each of the B-pieces of the pattern 12 making up the remainder are allocated to the mounters starting from the mounter 100 located in the process position farthest upstream (S10 in FIG. 14). In the optimization process in the present embodiment, component mounting for the B-pieces of the pattern 12 is carried out by being shared by all of the mounters 100.

The processes from S2 to S8 are the same as those shown in FIG. 14. In the case where the remainder B is not 0 (YES in S8), the optimization apparatus 300 selects the B-pieces of patterns from among the patterns 12 included in the board 20 that are located in positions that can be mounted on by all of the mounters 100. Furthermore, the optimization apparatus 300 optimizes the order of component mounting to be carried out during the mounting of components on the selected B-pieces of patterns 12, using all the mounters 100 (S20). The component mounting order optimization method uses commonly known technology. As such, detailed explanation on this shall be omitted.

Figure 23:
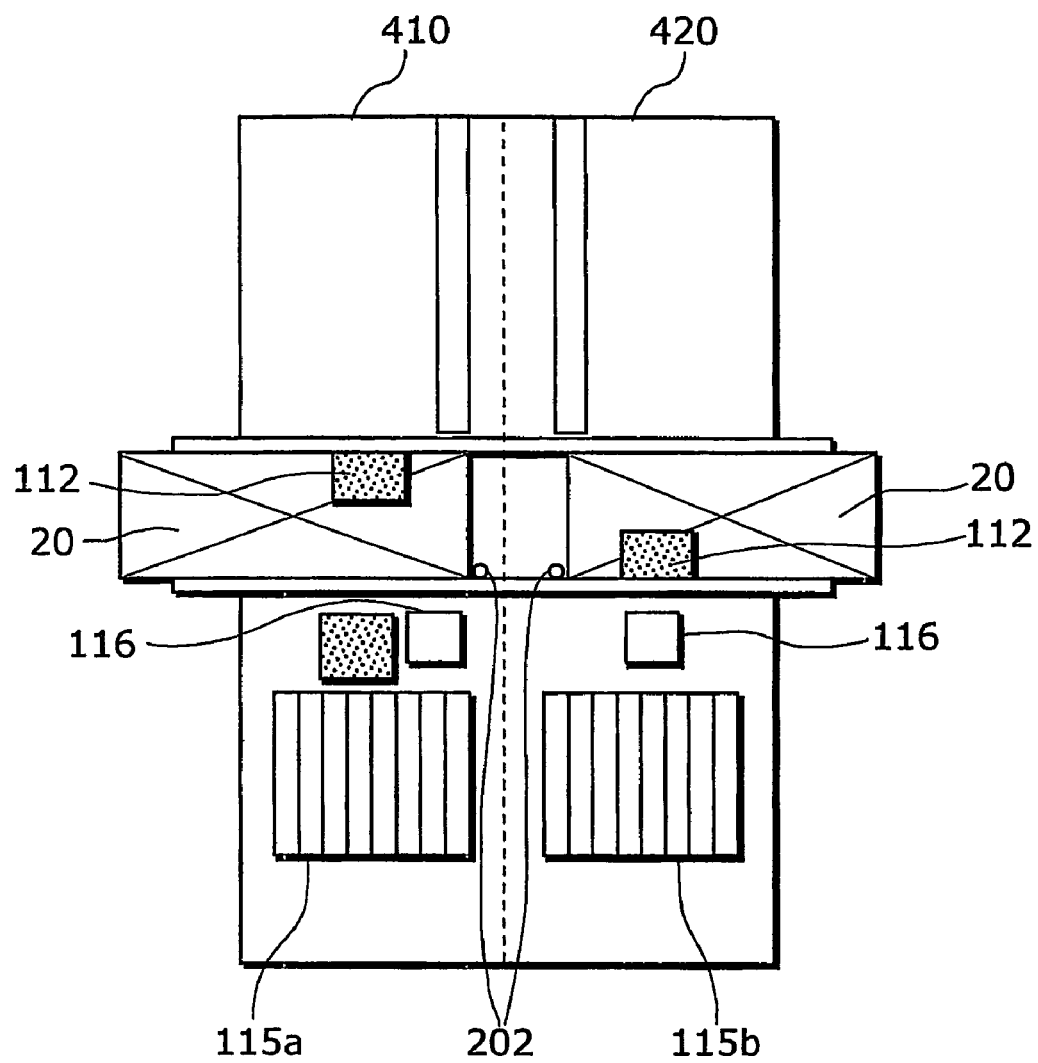
FIG. 23 is an overhead view showing the fundamental construction of the mounter in the component mounting system.
Figure 24:
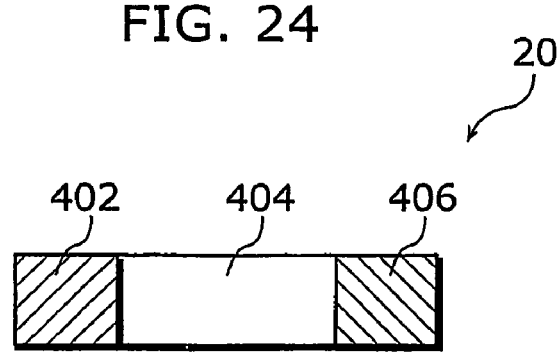
FIG. 24 is a diagram illustrating the positions on the board that are accessible for mounting.

The selection, in process S20, of the B-pieces of patterns located in positions that can be mounted on by all the mounters 100 is carried out in the following manner. Take for example, the case where boards 20 protrude from the transport rail, as shown in FIG. 23. In cases such as this, the left sub-unit 410 and the right sub-unit 420 cannot mount components on the patterns included in the protruding portion. That is, in the case of a single board 20, an area 402 that cannot be mounted on by the left sub-unit 410 and an area 406 that cannot be mounted on by the right sub-unit 420 emerge, as shown in FIG. 24. Accordingly, the optimization apparatus 300 selects the B-pieces of patterns from an area 404 which does not include these inaccessible areas.

Next, the optimization apparatus 300 carries out the processes in S12 and S14. Detailed explanation shall not be repeated as these processes are the same as those explained with reference to FIG. 14.

As shown in FIG. 25(a), it is assumed that ten of the patterns 12 are included on a board 20, and component mounting is carried out by two mounters 100 (4 sub-units). In this case, when the number of patterns which is 10 is divided by the number of sub-units which is 4, a quotient of 2, and a remainder of 2 are obtained (S4 in FIG. 22). As such, every sub-unit is allotted with two patterns each (Group 1 to Group 4, in FIG. 25(b)). Furthermore, with regard to the two patterns 12 which are the remainder, component mounting is carried out using all the sub-units (shared group, in FIG. 25(b)).

Moreover, the patterns 12 included in the shared group are selected from among the patterns 12 that are located in positions that can be mounted on by all of the four sub-units, as described earlier. As such, the patterns 12, within the board 20, which are positioned at the middle in the X-axis direction, are selected as the patterns 12 to be included in the shared group. It must be noted that with regards to the other groups, patterns 12 that are in positions that can be mounted on by each sub-unit, are selected.

As explained above, according to the present embodiment, in addition to the effects in the first embodiment, in the case where a remainder is present, component mounting on the patterns which are the remainder is handled by all of the mounters. Consequently, line balance can be further improved and stagnation of the board 20 at the upstream processes can be prevented. It should be noted that it is not necessary that the component mounting on the patterns which are the remainder should be handled by all of the mounters. Any allocation is possible for as long as it is an allocation is that can keep line balance. For example, in the case where the number of sub-units is four and there is a remainder of two patterns, it is possible to have the two sub-units located in the upstream process handling one of the patterns, and the two sub-units located in the downstream process handling the other pattern.

Moreover, it should be obvious that line balance can be equalized in the machine with a two stage construction shown in FIG. 2, or a machine having a one stage structure, by distributing the patterns that are the remainder to all of the machines.

Although explanation regarding the component mounting system in the present invention has been made based on the embodiments, the component mounting system is not limited to those explained in these embodiments.

For example, although the optimization apparatus 300 performs the optimization processing on one pattern 12 at the beginning of the optimization process shown in FIG. 14, it is not necessary for this to be carried out at the beginning. For example, it can also be carried out after patterns have been allocated to each mounter, or after the position of the stoppers are determined, or during other process stages. Furthermore, non-performance of the optimization process itself is also possible. Even then, the significance of the present invention is not lost, and variations to any of the aforementioned descriptions are included in the scope of the present invention.

Furthermore, the determination process for the stopper position (S14 in FIG. 14, FIG. 17) does not necessarily have to be carried out. However, as described above, maintaining uniformity in the line balance is made easier as an effect of carrying out this process.

Furthermore, the process of allocating patterns to mounters does not necessarily have to be done in such a way that, as much as possible, the Z positions (X coordinates) becomes the same. It goes without saying that any other method is possible, as long as it is an allocation method that can make the tact times of each of the mounters uniform.

Figure 19B:
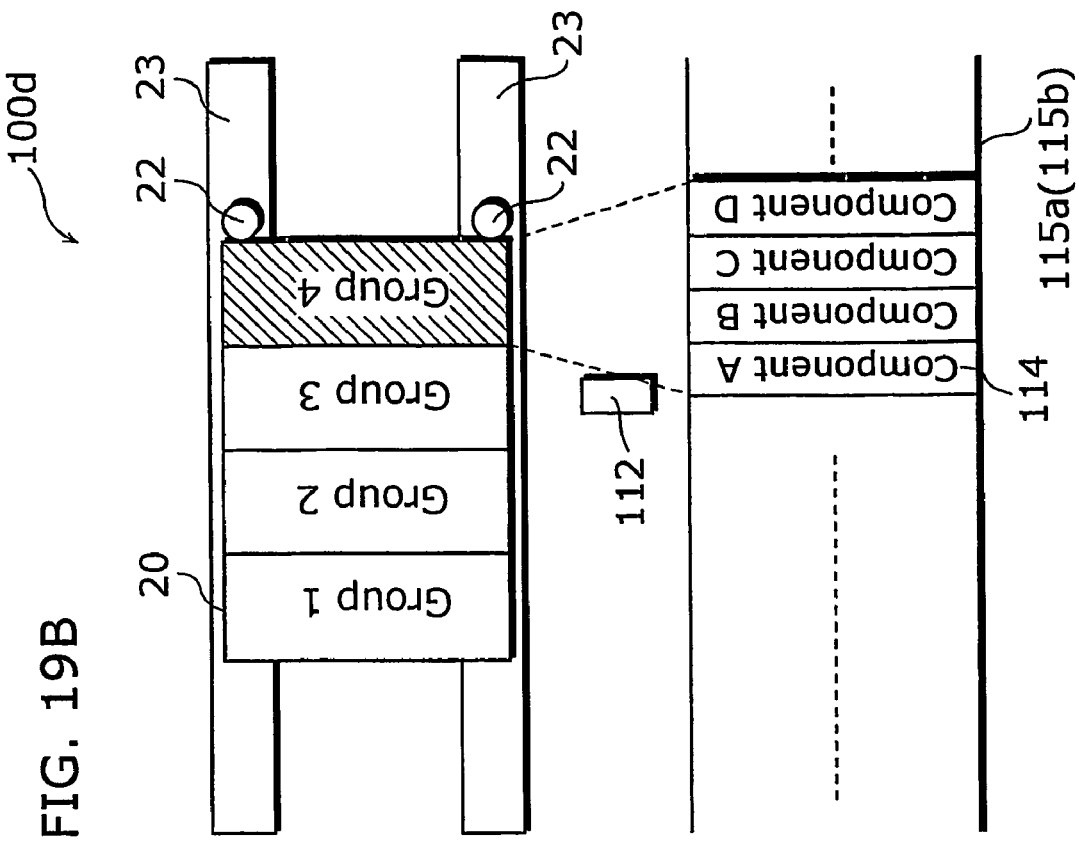
FIGS. 19A and 19B are diagrams illustrating the positions of the component cassettes of each mounter.
Figure 19A:
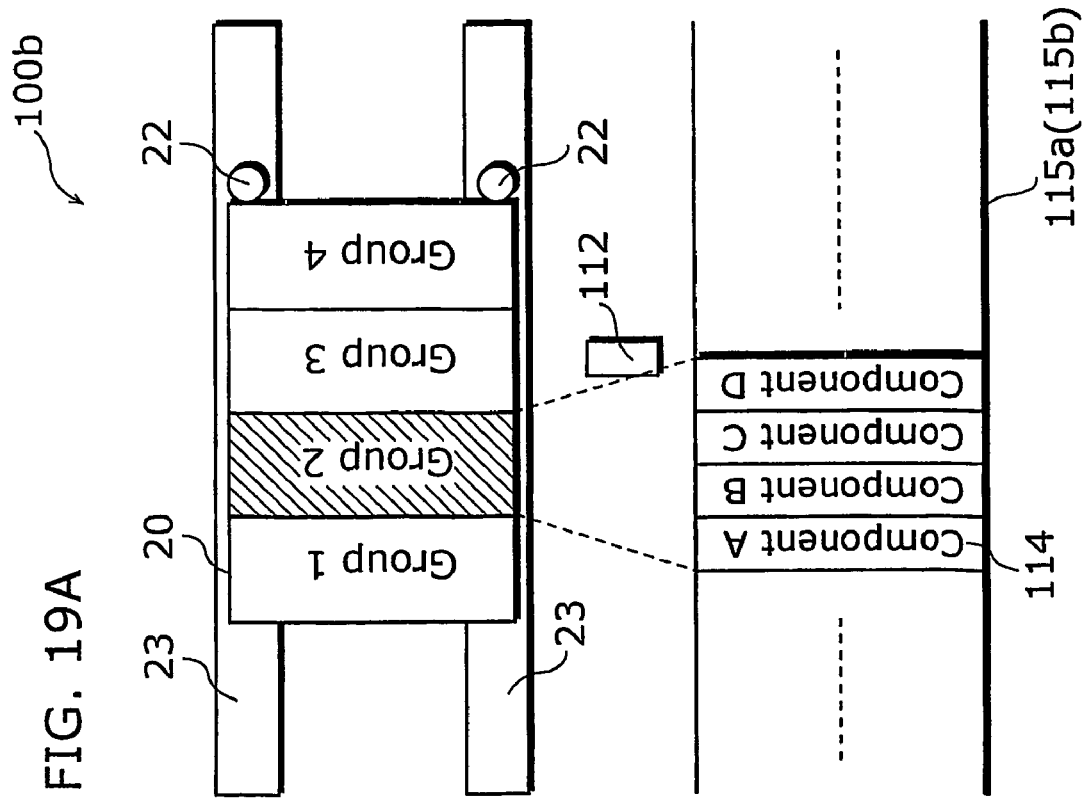
Figure 20:
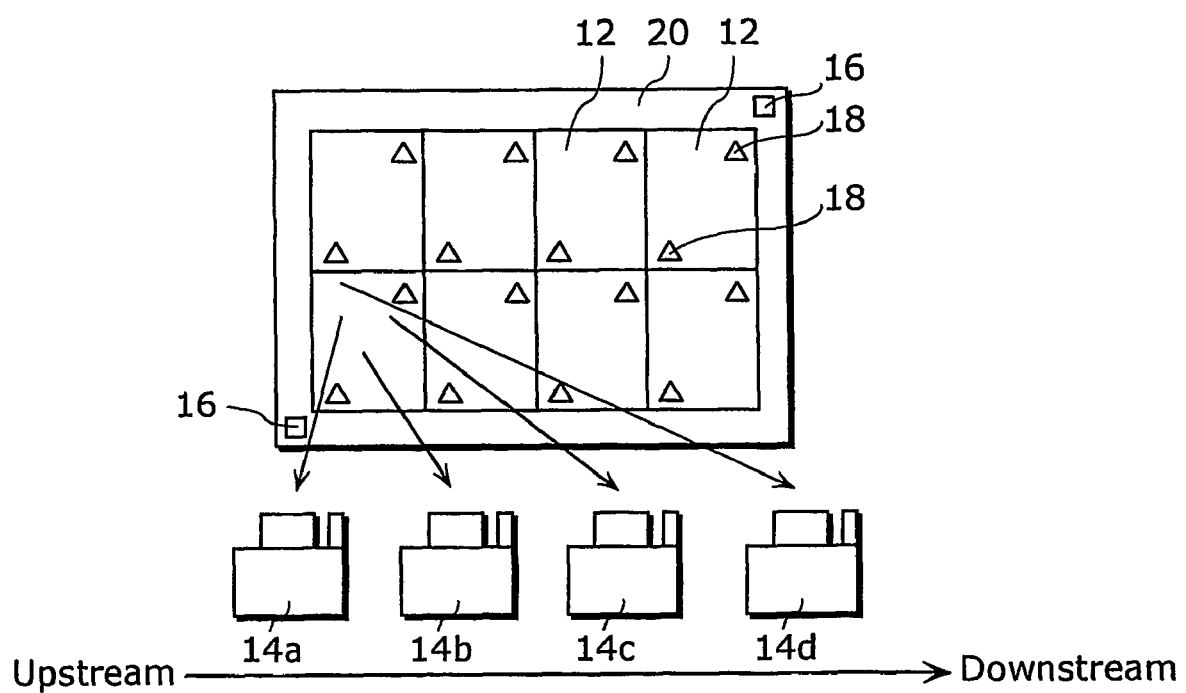
FIG. 20 is an exemplary diagram of how patterns are allocated in the conventional component mounting system.

Furthermore, it is also possible to have the stoppers at the same position for all of the mounters and change the positions of the component cassettes installed in the component supplying units instead. FIG. 19 is a diagram illustrating the setting positions of the component cassette 114 used in the mounters 100b and 100d. As shown in FIG. 19A and FIG. 19B, the position of the stoppers of mounter 100b and mounter 100d are the same. However, the position of the component cassettes 114 used during component mounting is set near the pattern that the respective mounter is tasked to handle. As such, the moving distance during mounting as well as the mounting time of the multi-placement head 112 is approximately uniform for each of the mounters, and line balance becomes uniform.

Furthermore, the number of mounters need not be limited to four, and it is possible to have a greater or lesser number of mounters.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The present invention can be applied in an optimization apparatus for the component mounting order in a mounter. The present invention can be applied particularly in such cases where a plurality of patterns is included in a single board, or the like.

What is claimed is:

1. An optimization method for optimizing an order of component mounting in a component mounting system having a plurality of mounters for mounting components onto a board,
   wherein each of the mounters includes a respective component supply unit and a respective placement head for picking up components from the respective component supply unit and for mounting the picked-up components onto the board,
   wherein the board includes a plurality of component patterns according to which components are mounted thereon, each of the component patterns having a same component placement structure,
   wherein the mounters are for mounting components onto the board according to one of (i) the component placement patterns of the board and (ii) groups of component placement patterns of the board,
   wherein each of the one of the component placement patterns and the groups of component placement patterns identifies a specific mounting arrangement of specific components to be mounted onto the board, and
   wherein the board is transported from a first mounter located upstream to a second mounter located downstream, such that the components are mounted onto the board in an order starting from the first mounter and continuing to the second mounter,
   the optimization method comprising:
      respectively allocating components to each of the mounters on one of a (i) per component placement pattern basis and (ii) per group of component placement patterns basis, such that, during the transporting of the board, the placement head of each of the mounters mounts every component of one of a respective component placement pattern and a respective group of component placement patterns, representing partial regions of the board, and such that all of the respective placement heads of the plurality of mounters mount the components onto the partial regions of the board resulting in the components being mounted onto every region of the board.

2. The optimization method according to claim 1, further comprising optimizing the order of component mounting for any one component placement pattern among a plurality of component patterns.

3. The optimization method according to claim 1, wherein the respectively allocating of the components further comprises:
   determining, from (i) a total number of component placement patterns of the board and (ii) a number of available mounters in the component mounting system, a number of respective component placement patterns to be allocated to each respective mounter so that the number of respective component placement patterns allocated to each respective mounter is approximately the same; and
   allocating the number of respective component placement patterns determined by the determining of the number of respective component placement patterns to any of the plurality of mounters for component mounting.

4. The optimization method according to claim 3, wherein the determining of the number of respective component placement patterns further comprises:
   calculating a quotient and a remainder by dividing the total number of component placement patterns of the board by the number of available mounters;
   determining the quotient as the number of respective component placement patterns to be allocated to each respective mounter, in a case where the remainder is zero; and
   in a case where the remainder is one or greater, (i) determining a number, which is the quotient plus one, as the number of component placement patterns to be allocated to a number of mounters equal to the remainder, starting from the first mounter, and (ii) determining the quotient as the number of component placement patterns to be allocated to mounters not having the quotient plus one as the number of component placement patterns allocated thereto.

5. The optimization method according to claim 3, wherein the determining of the number of respective component placement patterns further comprises:
   calculating a quotient and a remainder by dividing the total number of component placement patterns of the board by the number of available mounters; and
   first determining the quotient as the number of respective component placement patterns to be allocated to each respective mounter.

6. The optimization method according to claim 5, wherein the determining of the number of respective component placement patterns further comprises second determining the remainder as a number of component placement patterns to be commonly allocated among the plurality of mounters.

7. The optimization method according to claim 6, wherein, in the second determining, the number of component placement patterns to be commonly allocated to the plurality of mounters is determined so that a time for component mounting for each of the mounters is approximately the same.

8. The optimization method according to claim 6, wherein, in the allocating of the number of respective component placement patterns, the component placement patterns to be commonly allocated to the plurality of mounters are located in positions on the board at which components can be mounted by the plurality of mounters.

9. The optimization method according to claim 6, wherein the plurality of mounters includes all of the mounters included in the component mounting system.

10. The optimization method according to claim 3, wherein, in the allocating of the number of respective component placement patterns, the determined number of respective component placement patterns are allocated to each respective mounter based on which components are to be mounted, so that borders between the determined number of respective component placement patterns allocated to each respective mounter are set orthogonally to a direction in which the board moves through the component mounting system.

11. The optimization method according to claim 1 further comprising determining a position of the board during component mounting so that a moving distance, from a default position to an allocated pattern, of a head of each of the mounters is uniform for all of the mounters, the head being used for mounting components onto the board.

12. The optimization method according to claim 1 further comprising determining placement positions of component cassettes used in component mounting so that a distance from the placement positions of the component cassettes to an allocated pattern, for each of the mounters is uniform.

13. A computer-readable recording medium having a computer program recorded thereon, the computer program for optimizing an order of component mounting in a component mounting system having a plurality of mounters for mounting components onto a board,
   wherein each of the mounters includes a respective component supply unit and a respective placement head for picking up components from the respective component supply unit and for mounting the picked-up components onto the board, wherein the board includes a plurality of component patterns according to which components are mounted thereon, each of the component patterns having a same component placement structure,
   wherein the mounters are for mounting components onto the board according to one of (i) the component placement patterns of the board and (ii) groups of component placement patterns of the board,
   wherein each of the one of the component placement patterns and the groups of component placement patterns identifies a specific mounting arrangement of specific components to be mounted onto the board, and
   wherein the board is transported from a first mounter located upstream to a second mounter located downstream, such that the components are mounted onto the board in an order starting from the first mounter and continuing to the second mounter,
   the computer program causing a computer to execute an optimization method comprising:
   respectively allocating components to each of the mounters on one of a (i) per component placement pattern basis and (ii) per group of component placement patterns basis, such that, during the transporting of the board, the placement head of each of the mounters mounts every component of one of a respective component placement pattern and a respective group of component placement patterns, representing partial regions of the board, and such that all of the respective placement heads of the plurality of mounters mount the components onto the partial regions of the board resulting in the components being mounted onto every region of the board.

14. A mounter for mounting components on a board according to a mounting order optimized through an optimization method for optimizing an order of component mounting in a component mounting system having a plurality of mounters for mounting components onto a board, the mounter comprising:

a component supply unit; and a placement head operable to pick up components from the component supply unit and operable to mount the picked-up components onto the board, wherein the board includes a plurality of component patterns according to which components are mounted thereon, each of the component patterns having a same component placement structure, wherein the mounter mounts the components onto the board according to one of (i) the component placement patterns of the board and (ii) groups of component placement patterns of the board, and wherein each of the one of the component placement patterns and the groups of component placement patterns identifies a specific mounting arrangement of specific components to be mounted onto the board, wherein the board is transported from a first mounter located upstream to a second mounter located downstream, such that the components are mounted onto the board in an order starting from the first mounter and continuing to the second mounter, and wherein the optimization method includes respectively allocating components to each of the mounters on one of a (i) per component placement pattern basis and (ii) per group of component placement patterns basis, such that, during the transporting of the board, the placement head of each of the mounters mounts every component of one of a respective component placement pattern and a respective group of component placement patterns, representing partial regions of the board, and such that all of the respective placement heads of the plurality of mounters mount the components onto the partial regions of the board resulting in the components being mounted onto every region of the board.

15. An optimization apparatus for optimizing an order of component mounting in a component mounting system having a plurality of mounters for mounting components onto a board, wherein each of the mounters includes a respective component supply unit and a respective placement head for picking up components from the respective component supply unit and for mounting the picked-up components onto the board, wherein the board includes a plurality of component patterns according to which components are mounted thereon, each of the component patterns having a same component placement structure, wherein the mounters are for mounting components onto the board according to one of (i) the component placement patterns of the board and (ii) groups of component placement patterns of the board, wherein each of the one of the component placement patterns and the groups of component placement patterns identifies a specific mounting arrangement of specific components to be mounted onto the board, and wherein the board is transported through the component mounting system from a first mounter located upstream to a second mounter located downstream, such that the components are mounted onto the board in an order starting from the first mounter and continuing to the second mounter, the optimization apparatus comprising:

an optimizing unit operable to optimize the order of component mounting for any one component mounting pattern among the plurality of component mounting patterns; and an allocating unit operable to respectively allocate components to each of the mounters on one of a (i) per component placement pattern basis and (ii) per group of component placement patterns basis, such that, during the transporting of the board, the placement head of each of the mounters mounts every component of one of a respective component placement pattern and a respective group of component placement patterns, representing partial regions of the board, and such that all of the respective placement heads of the plurality of mounters mount the components onto the partial regions of the board resulting in the components being mounted onto every region of the board.

* * * * *